(12) United States Patent
Rombouts

(10) Patent No.: US 10,042,997 B2
(45) Date of Patent: Aug. 7, 2018

(54) AUTHENTICATION DEVICE AND SYSTEM

(75) Inventor: Peter Maria Franciscus Rombouts, Sint-Katelijne-Waver (BE)

(73) Assignee: NXP B.V., Eindhoven (NL)

( * ) Notice: Subject to any disclaimer, the term of this patent is extended or adjusted under 35 U.S.C. 154(b) by 1021 days.

(21) Appl. No.: 13/817,641

(22) PCT Filed: Aug. 22, 2011

(86) PCT No.: PCT/IB2011/053683
§ 371 (c)(1),
(2), (4) Date: Apr. 29, 2013

(87) PCT Pub. No.: WO2012/023122
PCT Pub. Date: Feb. 23, 2012

(65) Prior Publication Data
US 2013/0290735 A1 Oct. 31, 2013

Related U.S. Application Data

(60) Provisional application No. 61/375,756, filed on Aug. 20, 2010.

(51) Int. Cl.
*G06F 11/30* (2006.01)
*G06F 12/14* (2006.01)
(Continued)

(52) U.S. Cl.
CPC ............ *G06F 21/44* (2013.01); *G06F 21/33* (2013.01); *H04L 9/007* (2013.01); *H04L 9/3247* (2013.01);
(Continued)

(58) Field of Classification Search
CPC ........... H04L 63/0823; H04L 29/06775; H04L 2209/38; H04L 2209/64; H04L 63/08;
(Continued)

(56) References Cited

U.S. PATENT DOCUMENTS 6,141,544 A    10/2000   Corriveau et al.
7,929,703 B2 *  4/2011   Bellows .................. H04L 41/28
                                                      380/270
(Continued)

FOREIGN PATENT DOCUMENTS

CN    101401341 A    4/2009
CN    101626293 A    1/2010

OTHER PUBLICATIONS

Menezes, A. J. et al. "Chapter 13: Key Management Technique", Handbook of Applied Cryptography, pp. 543-590 retrieved from the internet at: http://ww.car.math.uwaterloo.ca/hac/ (Oct. 1, 1996).

(Continued)

*Primary Examiner* — Daniel B Potratz

(57) ABSTRACT

A public key architecture (160) includes a dual certificate hierarchy which facilitates two independent authentication functions. One of the authentication functions authenticates an authentication device (164) to a verification device (166). The other authentication function authenticates a configuration device (162) to the authentication device (164). In some embodiments, the authentication process uses a lightweight certificate formed in conjunction with a lightweight signature scheme (370).

16 Claims, 19 Drawing Sheets

(51) Int. Cl.
*G06F 21/44* (2013.01)
*G06F 21/33* (2013.01)
*H04L 9/00* (2006.01)
*H04L 9/32* (2006.01)
*H04L 29/06* (2006.01)

(52) U.S. Cl.
CPC ........ *H04L 9/3265* (2013.01); *H04L 63/0823* (2013.01); *H04L 2209/38* (2013.01)

(58) Field of Classification Search
CPC ....... H04L 9/006; H04L 9/007; H04L 9/0825; H04L 9/3263; H04L 9/3265
See application file for complete search history.

(56) References Cited

U.S. PATENT DOCUMENTS

| | | | |
|---|---|---|---|
| 8,009,830 B2 | 8/2011 | Orsini et al. | |
| 2003/0188176 A1 | 10/2003 | Abbondanzio et al. | |
| 2007/0050622 A1 | 3/2007 | Rager et al. | |
| 2008/0172562 A1 | 7/2008 | Cachin et al. | |
| 2008/0244717 A1 | 10/2008 | Jelatis et al. | |
| 2009/0245184 A1* | 10/2009 | Torres | H04W 4/02 370/329 |
| 2009/0268903 A1 | 10/2009 | Bojinov et al. | |
| 2009/0271454 A1 | 10/2009 | Anglin et al. | |
| 2010/0212017 A1 | 8/2010 | Li et al. | |
| 2011/0028091 A1* | 2/2011 | Higgins | H04L 63/0492 455/41.2 |
| 2011/0087882 A1* | 4/2011 | Kuo | G06F 21/57 713/156 |
| 2011/0276803 A1* | 11/2011 | Bender | H04L 9/321 713/175 |

OTHER PUBLICATIONS

International Search Report for Patent Appln. PCT/IB2011/053683 (May 30, 2012).
Extended European Search Report for Appl. No. 13169564.5-1860, dated Jul. 29, 2013.
First Chinese Office Action dated Dec. 29, 2014 for Chinese Appl. No. 201180040180.0, Dec. 29, 2014.
Second Chinese Office Action dated May 12, 2015 in Appl. No. 201180040180.0, May 12, 2015.
Arazi, "Message Authentication in Computationally Constrained Environments", IEEE Transactions on Mobile Computing, IEEE Service Center, Los Almitos, CA, US, vol. 8, No. 7, 968-974, Feb. 20, 2009.
Armknecht, et al., "Using Merkle's Puzzle for key agreement with low-end devices", Local Computer Networks, 2009. LCN 2009. IEEE 34th Conference on, IEEE, Piscataway, NJ, USA, Oct. 20, 2009, 858-864.
Oh, et al., "A Secure Communication Protocol for Low-Cost RFID System", Computer and Information Technology, 2007. Cit 2007. 7th IEEE International Conference on, IEEE, Piscataway, NJ, USA, Oct. 16, 2007, 949-954.
Vajda, et al., Lightweight Authentication Protocols for Low-Cost RFID Tags, Jul. 7, 2007.
Menezes, A. J. et al. "Chapter 11: Digital Signatures", Handbook of Applied Cryptography, 66 pgs., retrieved from the internet at: http://www.cacr.math.uwaterloo.ca/hac (Jan. 10, 1996).
Office Action for CN counterpart Appl. No. 201510058364.X (dated Jan. 19, 2017).

* cited by examiner

AUTHENTICATION DEVICE AND SYSTEM

This application claims the benefit of U.S. Provisional Application No. 61/375,756, entitled "Product Authentication Method, System and Device," filed on Aug. 20, 2010, which is incorporated by reference herein in its entirety.

Authentication devices are devices that are capable of cryptographically proving authenticity to a verification device. When an authentication device is attached to or included in another device or product, the authentication device can also prove the authenticity of the corresponding device or product. For this reason, conventional authentication devices can be used as an anti-counterfeiting solution.

FIG. 1 depicts a block diagram of a conventional authentication architecture 10, in which an authentication device 12 is in communication with a verification device 14. The authentication device 12 includes an authentication private key 16 and an authentication public key certificate 18, which are unique to the authentication device 12. The authentication public key certificate 18 includes identification information 20 which includes information about the identity of the authentication device 12 and/or another device or product (not shown) to which the authentication device 12 is attached. The authentication device 12 also may include one or more optional intermediate certificates 22 to link the authentication public key certificate 18 to a trusted root authentication certificate 24 stored at the verification device 14. The trusted root authentication certificate 24 forms the root of trust for an authentication certificate chain.

A conventional authentication procedure typically includes executing an authentication protocol in which the authentication device 12 proves its knowledge of the authentication private key 16 to the verification device 14. The verification device 14 uses a public key from the authentication public key certificate 18 during this authentication procedure to determine if the authentication device 12 knows the authentication private key 16. This authentication procedure is also referred to as a challenge-response protocol. Then the verification device 14 verifies the authentication public key certificate 18. This verification includes verification of the information about the identity of the authentication device 12 and/or the device to which it is connected. If there are multiple certificates in the authentication certificate chain, then the verification device 14 also verifies each of the certificates in the authentication certificate chain using the public key from the next certificate in the authentication certificate chain until the authentication root certificate 24 is reached.

Although conventional authentication systems are effective in some aspects, other aspects of conventional authentication systems are unnecessarily restrictive. For example, the authentication public key certificate can only be generated by the owner of the authentication private key of the next certificate in the authentication certificate chain. Additionally, the authentication public key certificate cannot be updated (or is very difficult to update) at a later time.

There are also certain disadvantages with aspects of the certificate and signature schemes implemented in conventional authentication systems. In particular, a cryptographic signature over a message is typically created by applying a one-way transformation (hash) on the message. The hash is then encrypted with the authentication private key of a public key cryptographic algorithm. Several conventional signature schemes offer partial message recovery; in which a part of the signed message can be recovered from the signature. This results in conventional certificate formats containing a significant amount of meta-data in addition to a signature. Specifically, the usage of a hash and a signature scheme without message recovery (or only partial message recovery) results in most or all of the hashed text being sent along with the signature, resulting in a large amount of data to be stored and/or transmitted.

Embodiments of an apparatus are described. In one embodiment, the apparatus is an authentication device. The authentication device includes a memory device and processing logic. The memory device stores data. The processing logic is configured to store a device authentication private key, a device authentication public key certificate, and a configuration root certificate in the memory device. The processing logic is further configured to use the device authentication private key and the device authentication public key certificate to facilitate authentication of the authentication device to a verification device according to a device authentication protocol. The processing logic is further configured to use the configuration root certificate to facilitate authentication of a configuration device to the authentication device according to a configuration authentication protocol. Other embodiments of the apparatus are also described.

Embodiments of an authentication method are also described. In one embodiment, the authentication method includes storing a device authentication private key on an authentication device. The authentication method also includes storing a device authentication public key certificate on the authentication device. The device authentication private key and the device authentication public key certificate facilitate authentication of the authentication device to a verification device according to a device authentication protocol. The authentication method also includes storing a configuration root certificate on the authentication device. The configuration root certificate facilitates authentication of a configuration device to the authentication device according to a configuration authentication protocol. Other embodiments of the authentication method are also described.

Embodiments of a configuration method for an authentication device are also described. In one embodiment, the configuration method includes initializing authentication parameters on the authentication device for authentication of the authentication device to a verification device. The configuration method also includes locking the authentication parameters on the authentication device to preclude further initialization operations related to the authentication parameters. The configuration method also includes receiving a configuration parameter at the authentication device subsequent to the locking of the authentication parameters. The configuration method also includes authenticating the configuration parameter. The configuration method also includes storing the configuration parameter on the authentication device. Other embodiments of the configuration method are also described.

Embodiments of a method for creation of a lightweight signature are also described. In one embodiment, the creation method includes forming the formatted data element according to a signature format. The signature format includes a representation of the data and a padding field to store a padding value. The formatted data element inclusive of the padding field has a numerical value that is less than a numerical value of an encryption modulus of a private key. In a particular embodiment, the padding field includes the most significant bits of the numerical interpretation of the formatted data element. The method also includes subsequently applying an encryption algorithm to the formatted data element using the private key. Other embodiments of the configuration method are also described.

Embodiments of a system are described. In one embodiment, the system is a system for creating and using a lightweight signature in conjunction with a lightweight certificate in an authentication architecture. The system includes a memory device to store data and a private key. The system also includes a processor coupled to the memory device. The processor is configured form a formatted data element according to a signature format. The signature format includes a representation of the data and a padding field to store a padding value. The formatted data element inclusive of the padding field has a numerical value that is less than a numerical value of an encryption modulus of a private key. In a particular embodiment, the padding field includes the most significant bits of the numerical interpretation of the formatted data element. The processor is also configured to subsequently encrypt the formatted data element using the private key. Other embodiments of the system are also described.

Other aspects and advantages of embodiments of the present invention will become apparent from the following detailed description, taken in conjunction with the accompanying drawings, illustrated by way of example of the principles of the invention.

Throughout the description, similar reference numbers may be used to identify similar elements.

Figure 1:
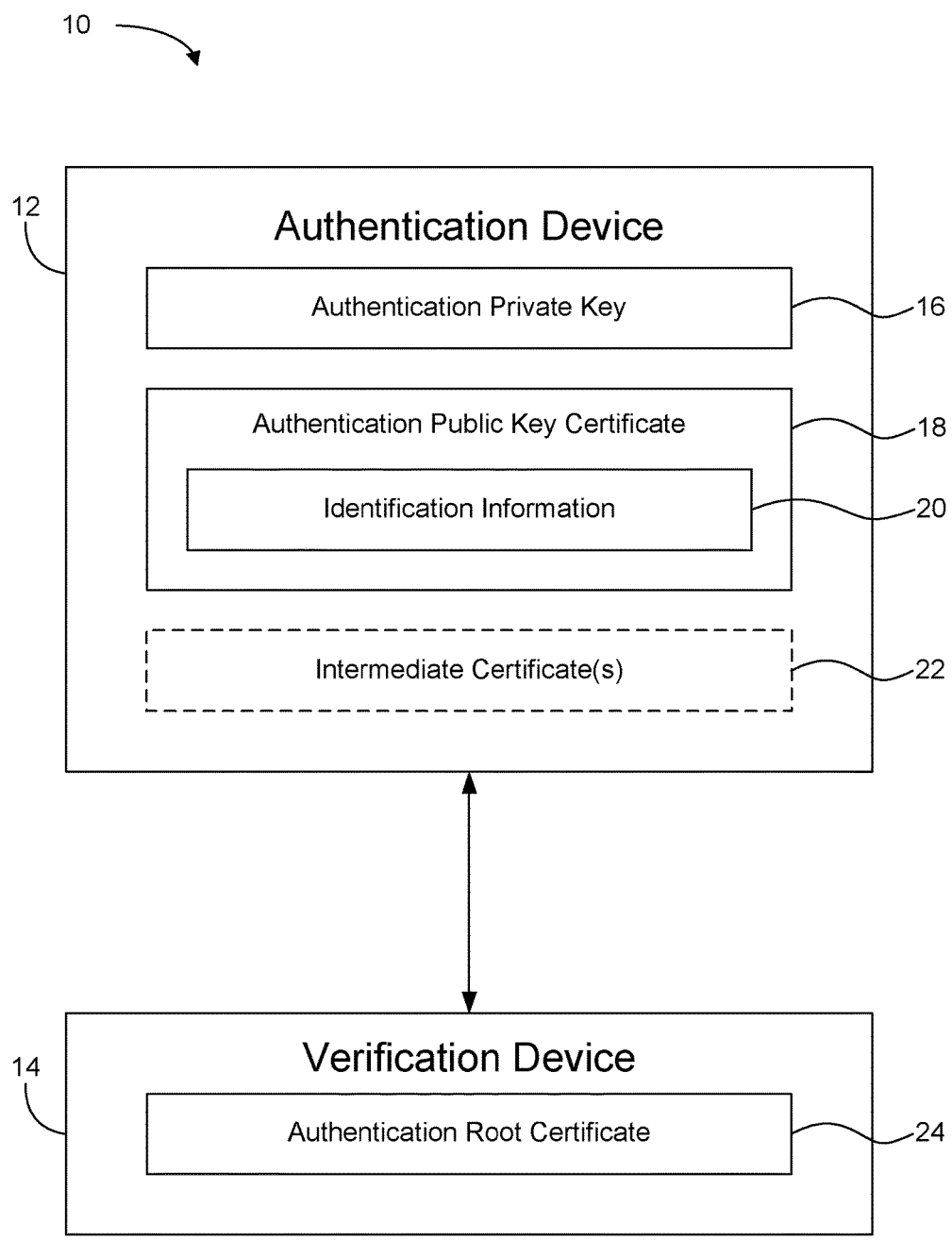
FIG. 1 depicts a block diagram of a conventional authentication architecture.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments focus on authentication devices that rely on public key cryptography for proving the authenticity. In one embodiment, the interaction of the authentication devices includes several procedures such as an authentication procedure and a configuration procedure.

For reference, many different names and designations are used to refer to devices, parties, and/or entities involved in one or more aspects of device authentication. Some of these names are product, authentication device, manufacturer, brand owner, trusted party, and host. References to the product generally refer to a product for which proof of authenticity is requested or expected. References to the authentication device generally refer to a device embedded in or attached to a product. References to the manufacturer generally refer to the manufacturer of the authentication device. References to the brand owner generally refer to an owner of intellectual property associated with the product.

References to the trusted party generally refer to a party that manages the authentication system. Thus, the brand owner may rely on the trusted party for certifying authenticity. References to a host generally refer to a party or device which performs product authentication.

Some of the features of one or more embodiments may include, but are not limited to, the following: the Product authentication uses public key cryptography and certificates; the public key system is managed by a trusted party; initialization is independent of the brand owner; the brand owner can securely configure the device; the system can be used in conjunction with existing PKI systems; the system can be used effectively, if at all, with existing signature schemes; no brand owner keys or certificates are needed for verification, only the root authentication certificate of the trusted party; no secret values are required for verification; each device can be configured with a unique private key limiting the impact in case of a security breach on the authentication device; and so forth.

Figure 2:
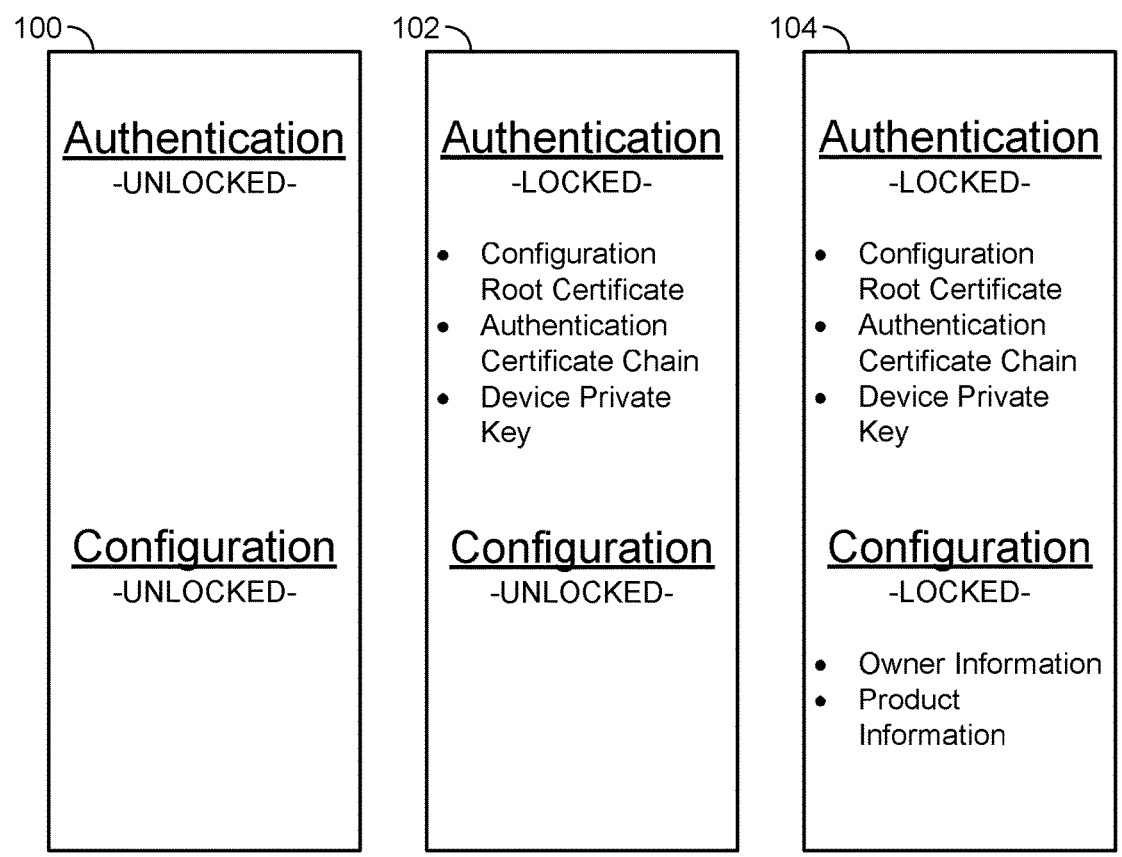
FIG. 2 depicts a block diagram of one embodiment of stages of authentication device set up procedure.

FIG. 2 depicts a block diagram of one embodiment of stages of authentication device set up procedure. The illustrated embodiment includes a first stage 100, a second stage 102, and a third stage 104. In some embodiments, the authentication device set up procedure may include fewer or more stages.

In the illustrated embodiment, the first stage 100 of the device set up is unlocked in both the authentication portion and the configuration portion so that information may be saved to the device. In the second stage 102, the authentication portion stores authentication information and has been locked. In the illustrated embodiment, certain authentication parameters are shown. However, other embodiments may include fewer, more, or other authentication parameters. In the illustrated embodiment of the second stage 102, the configuration portion remains unlocked. In the third stage 104, the authentication portion is locked and the configuration portion stores configuration parameters. Additionally, the configuration portion is locked to finalize the authentication device.

In some embodiments, the manufacturer of the authentication device may save information to and lock the authentication portion, leaving the configuration portion unlocked for use or access by another person or entity. For example, a user may then add information to the configuration portion without the direct action of the manufacturer. The configuration portion may then be locked to finalize the device for use. Other embodiments may facilitate other advantages and may be executed in a different order.

Figure 3:
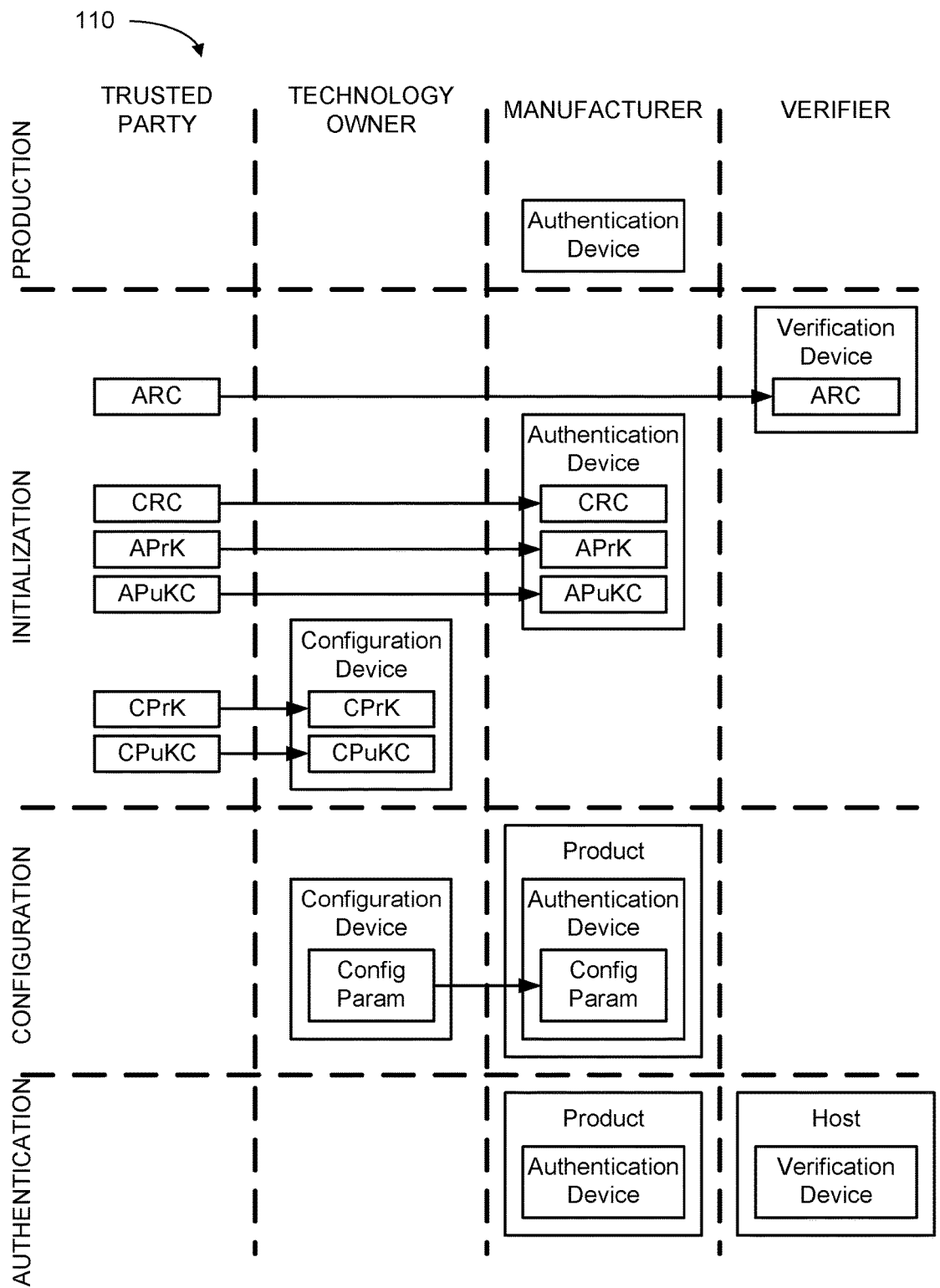
FIG. 3 depicts a block diagram of one embodiment of an authentication progression.

FIG. 3 depicts a block diagram of one embodiment of an authentication progression 110. The illustrated authentication progression 110 generally illustrates operations corresponding to stages and parties involved in an embodiment of the authentication process. Although specific stages and parties are illustrated and described herein, other embodiments may implement fewer or more stages by fewer or more parties. Alternatively, at least some of the depicted operations may be implemented in other stages differently from the specific embodiment shown in FIG. 3.

In the illustrated embodiment, there are four parties or entities, namely the trusted party, the technology owner (also referred to as the brand owner), the manufacturer, and the verifier. Also, there are four distinct stages, namely a production stage, an initialization stage, a configuration stage, and an authentication stage.

Figure 4:
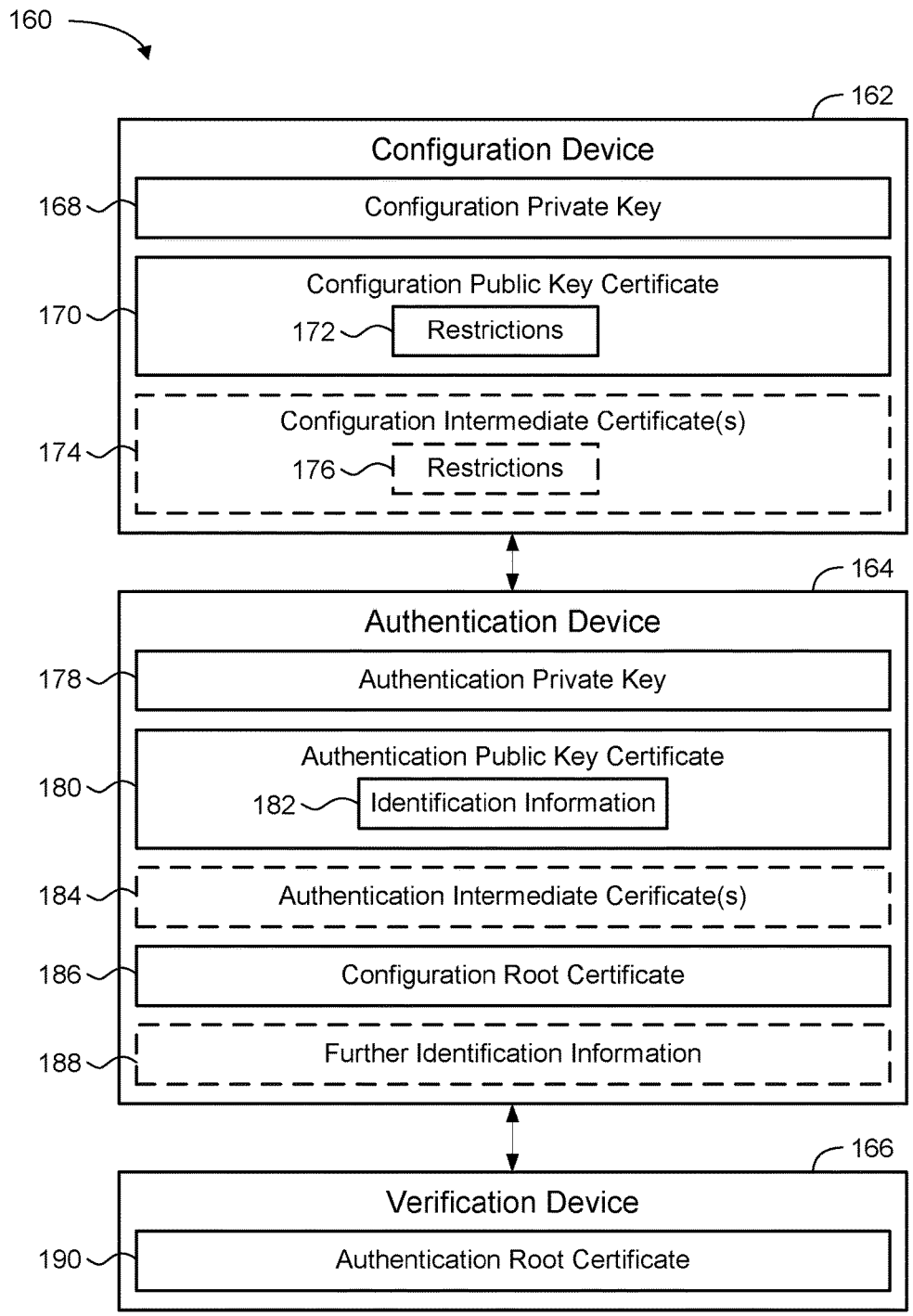
FIG. 4 depicts a block diagram of one embodiment of an authentication architecture which includes a configuration device

In the production stage, the manufacturer produces an authentication device (refer to FIG. 4). In the initialization stage, the trusted party sends an authentication root certificate (ARC) to the verification device. The trusted party also sends an authentication private key (APrK) and a corresponding authentication public key certificate (APuKC) to the authentication device. Alternatively, the authentication device generates the authentication keys and exports the public key to the trusted party, which places the public key in a certificate and sends the certificate back to the authentication device. After these operations, the initialization of the authentication device may be locked to prevent further initialization operations which might modify or change the authentication private key and/or the authentication public key certificate on the authentication device.

Also, in the initialization stage, the trusted party sends a configuration root certificate (CRC) to the authentication device. The trusted party also sends a configuration private key (CPrK) and a corresponding configuration public key certificate (CPuKC) to a configuration device. Alternatively, the configuration device generates the configuration keys and exports the public key to the trusted party, which places the public key in a certificate and sends the certificate back to the configuration device. After these operations, the initialization of the configuration device may be locked to prevent further initialization operations which might modify or change the configuration private key and/or the configuration public key certificate on the configuration device. In an alternative embodiment, some or all of the operations to establish the relationship between the authentication device and the configuration device (by storing the respective keys and certificates) may be performed during a subsequent stage, in which case locking the authentication device and/or the configuration device may be delayed.

After the authentication device is set up to authenticate data from the configuration device, the configuration device may send one or more configuration parameters to the authentication device for storage on the authentication device. Some examples of configuration parameters include, but are not limited to, a brand name and a product name. As illustrated, the authentication device is attached to, integrated with, or otherwise associated with a product. The attachment, integration, or other association between the authentication device and the product may be performed by the technology owner. In this manner, the manufacturer of the authentication device does not necessarily have to be involved in final configuration of brand, product, or other similar parameters of the product with which the authentication device is associated by the technology owner.

After the authentication device is configured with the configuration parameters, the product may be used in normal transactions, including subsequent authentication transactions to verify proof of authenticity of the product. Additionally, in some embodiments, one or more of the configuration parameters may be modified or updated by the technology owner at a later time, using the configuration authentication procedures described herein.

As shown in FIG. 3, the public key architecture described herein includes two separate certificate chains that both originate from the trusted party as a root of trust. The first certificate chain allows the trusted party to exert its control over the configuration operations performed by the brand owner. It assures that the brand owner can execute configuration operations to bind the authentication device to its product(s). The configuration root certificate is the root of trust for the configuration certificate chain. This certificate is installed on all authentication devices in order for them to be available to verify the brand owner configuration public key certificate. The brand owner configuration public key certificate is used during configuration operations to authenticate a brand owner to an authentication device. In one embodiment, the configuration public key certificate contains the brand owner information that is stored in the authentication device during configuration. These two certificates make up the configuration certificate chain which ultimately controls access to configuration parameters at the authentication device. It is possible to include intermediate configuration certificates in the configuration certificate chain. In some embodiments, intermediate configuration certificates are excluded, unless the trusted party can strictly control which brand owner configuration public key certificates are signed by them.

The second certificate chain is used to prove the authenticity of the authentication device and the brand owner and product information stored in the authentication device. The second certificate chain is used by the host to verify product authenticity by tracing it back to the root of trust (i.e., the trusted party). The authentication root certificate is the root of trust for the authentication certificate chain. This certificate is installed on all hosts in order for them to be able to verify the authenticity of the product. The device authentication certificate is a device specific certificate which can be verified directly with the authentication root certificate or through a series of intermediate authentication certificates leading up to the trusted party root certificate. Together they form the authentication certificate chain which ultimately proves that the authentication device that contains the device private key is authentic.

FIG. 4 depicts a block diagram of one embodiment of an authentication architecture 160 which includes a configuration device 162. The authentication architecture 160 also includes an authentication device 164 and a verification device 166. The configuration device 162 is operable to communicate with the authentication device 164. The authentication device 164 is also operable to communicate with the verification device 166. Although the authentication architecture 160 is shown and described herein with certain components and functionality, other embodiments of the authentication architecture may have fewer or more components and my implement less or more functionality.

In one embodiment, the verification device 166 may be implemented in a near field communication (NFC) device such as a mobile telephone or other mobile electronic device. By incorporating some or all of the verification functionality described herein into a mobile electronic device with NFC operability, a consumer or other operator of the mobile electronic device may be able to take the role of verifier in the authentication scheme describe herein. Similarly, a mobile electronic device may be configured to take the role of verifier in any other authentication scheme.

The depicted configuration device 162 includes a configuration private key 168 and a configuration public key certificate 170, which are unique to the authentication device 162. The configuration public key certificate 170 includes a set of restrictions 172. The restrictions may specify configuration operations that the configuration device 162 is or is not authorized to facilitate on the authentication device 164. The depicted configuration device 162 includes an optional set of configuration intermediate certificates 174 to link the configuration public key certificate 170 to a trusted configuration root certificate 186 stored on the authentication device 164. Each intermediate configuration certificate may contain a set of restrictions 176 that is more restrictive than the set of restrictions of the next key in the certificate chain (i.e., the certificate that is one step 'closer' to the root certificate).

The authentication device 164 includes an authentication private key 178 and an authentication public key certificate 180, which are unique to the authentication device 164. The authentication public key certificate 180 may include some information 182 about the identity of the authentication device 164 and/or the device to which the authentication device 164 is attached or in which the authentication device 164 is included. The authentication device 164 also includes an optional set of authentication intermediate certificates 184 to link the authentication public key certificate 180 to a trusted root authentication certificate. The authentication device 164 also includes the trusted configuration root certificate 186 that forms the root of trust for the configuration certificate chain. In some embodiments, the authentication device 164 also includes additional information 188 about the identity of the authentication device 164 and/or the device it is attached to/included in. This additional information 188 can only be stored in the authentication device 164 by a configuration device 162 after it has authenticated to the authentication device 164 using its configuration private key 168 and certificate chain. The verification device 166 includes a trusted authentication root certificate 190 that forms the root of trust for the authentication certificate chain.

In one embodiment, the authentication architecture 160 facilitates an authentication procedure. An embodiment of the authentication procedure includes execution of an authentication protocol (e.g., a challenge-response protocol) in which the authentication device 164 proves its knowledge of the authentication private key 178 to the verification device 166. The authentication protocol also certifies the additional information about the identity of the authentication device 164 and/or the device to which the authentication device 164 is attached. The verification device 166 uses the public key from the authentication public key certificate 180 during this authentication protocol to determine if the authentication device 162 knows the corresponding private key. Then the verification device 166 verifies the authentication public key certificate 180. This verification includes verification of the information 182 about the identity of the authentication device 164 and/or the device to which the authentication device 164 is connected. If there are no intermediate certificates, then the verification device 166 verifies the authentication public key certificate 180 directly with the authentication root certificate 190. Otherwise, if there are multiple certificates in the authentication certificate chain, then the verification device 166 also verifies each of the certificates in the authentication certificate chain using the public key from the next certificate in the authentication certificate chain until the authentication root certificate 190 is reached.

The authentication architecture 160 also facilitates a configuration procedure. The configuration procedure is, to an extent, a separate authentication procedure between the configuration device 162 and the authentication device 164 which, if successful, makes it possible for the configuration device 162 to set configuration parameters at the authentication device 164. An embodiment of the configuration procedure includes execution of an authentication protocol (e.g., a challenge-response protocol) in which the configuration device 162 proves its knowledge of the configuration private key 168 to the authentication device 164. The configuration protocol also certifies the additional information that the configuration device 162 is attempting to store at the authentication device 164. The authentication device 164 uses the public key from the configuration public key certificate 170 during this configuration protocol to determine if the configuration device 162 knows the corresponding private key. The authentication device 164 then verifies the configuration public key certificate 170. This verification includes verification of the restrictions 172 encoded in the configuration public key certificate 170 and a verification of the certificate using the public key from the next certificate in the configuration certificate chain. If there are no intermediate certificates, then the authentication device 164 verifies the configuration public key certificate 170 directly with the configuration root certificate 186. Otherwise, if there are multiple certificates in the configuration certificate chain, then the authentication device 164 also verifies each of the certificate(s) in the configuration certificate chain using the public key from the next certificate in the configuration certificate chain until the configuration root certificate 186 is reached. In one embodiment, this verification includes a verification of the restrictions 176 encoded in the configuration intermediate certificates 174 such that the authentication device 164 checks if the restrictions 176 are less restrictive for the next certificate in the chain.

In addition to the advantages which may be achieved by implementation of the individual components of the authentication architecture 160 of FIG. 4, some embodiments of the authentication architecture 160 provide additional advantages over conventional authentication technology. For example, in some embodiments each entity holding a private key 168 corresponding to either the configuration root certificate 186 or a configuration intermediate certificate 174 can create a certificate 170 that allows a second entity to configure the authentication device by creating a configuration certificate corresponding to the configuration private key 168 of the configuration device 162. By performing this operation once for each configuration device 162, once the configuration device has been loaded with its configuration certificate 170 and the applicable configuration intermediate certificates 174, the configuration device 162 can configure any number of additional authentication devices 164. In contrast, using conventional methods the holder of a private key corresponding to either the authentication root certificate 190 or an authentication intermediate certificate 184 generates a certificate 180 for each authentication device 164.

As another example of a potential advantage of one or more embodiments, at the same time the entities holding a private key corresponding to either the configuration root certificate 186 or a configuration intermediate certificate 174 can exert control over the configuration operations that can be performed by the configuration device 162 using the restrictions 172 encoded in the configuration certificate 170. This potentially also allows the additional identifying information 188 in the authentication device 164 to be modified/updated. Strict controls may be implemented to facilitate such modifications/updates.

As another example of a potential advantage of one or more embodiments, the authentication certificates are generic so that they can apply to a large variety of authentication devices 162. As used herein, the reference to generic authentication certificates and/or devices refers to the absence of product, brand, or other characterizing information so that the authentication certificates and/or devices are not specific to a particular product. While each authentication device has a different private key and corresponding certificate, the authentication devices are generic until they are modified to include product, brand, or other specific information. Using generic authentication certificates may lead to lower manufacturing costs. In contrast, using conventional methods a new certificate is specifically generated and characterized for each authentication device 162. Inclusion of product information makes an authentication device specific to that product and, hence, puts a big restriction on the production process of the authentication devices. In contrast, excluding or delaying the characterization of product information maintains the generic nature of the authentication devices.

In some embodiments, the authentication devices may be preloaded with specific authentication information. For example, the authentication devices may be pre-loaded with authentication certificates that specify the manufacturer and/or brand name of the product they are protecting. In this example, the configuration certificate contains restrictions that allow only the product name, type, and serial number to be written in the authentication device. This set-up allows this manufacturer to order larger quantities of authentication devices that can only be used with its products, yet with the flexibility to securely load the product related information onto the authentication device. In other embodiments, different configuration parameters may be specified and loaded by the manufacturer and/or another authorized party.

In some embodiments, the authentication devices may be preloaded with generic information to facilitate further customization to specific applications. For example, the authentication devices may be pre-loaded with authentication certificates that are generic (i.e., only containing certificates that are certified by a third party that guarantees that the authentication devices themselves are authentic) and subsequently can be configured using configuration certificates. In some embodiments, the configuration certificates are also under control of the same third party which holds the configuration and authentication root certificates. The configuration certificates issued by this third party or one of its delegates (holding a configuration intermediate certificate) may contain restrictions that allow only a specific manufacturer and/or brand name (or other configuration parameter) to be written in the authentication device as well as any product name, type and serial number. This example set-up allows large quantities of authentication devices to be produced that can be sold to a variety of manufacturers and/or brand owners. These manufacturers and/or brand owners can subsequently configure their own manufacturer and/or brand name (or other permitted configuration parameters) in the authentication device as well as any product name, type and serial number of their products.

In one more embodiment, the configuration certificate may contain restrictions that allow modification of authentication certificates on the authentication device. This allows new certificates to be installed on the authentication device. This also allows the authentication certificate chain to be replaced by a different one which may have a different root of trust (e.g., managed by the brand owner.)

Figure 5A:
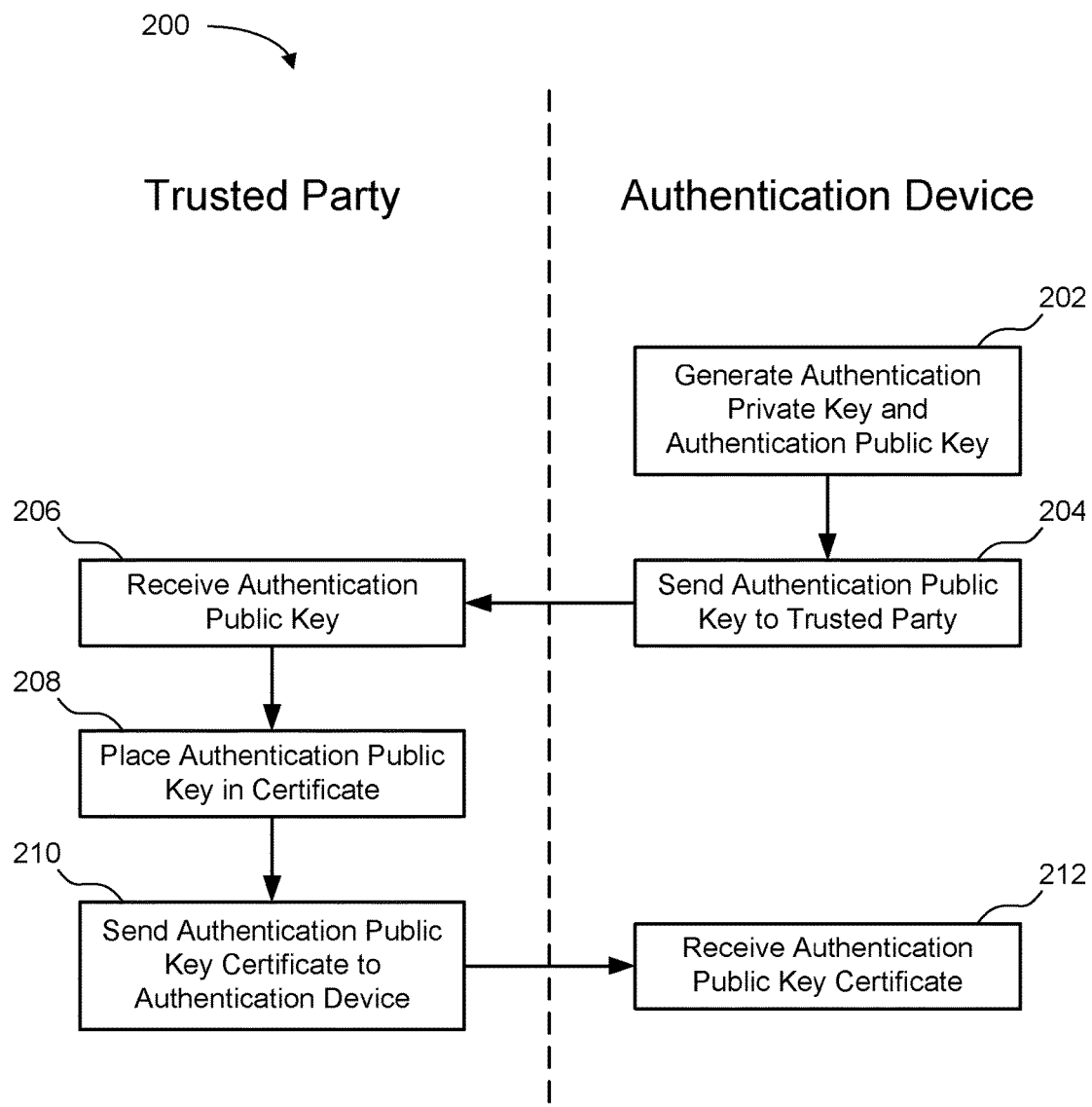
FIG. 5A depicts a flow chart of one embodiment of an initialization operation to initialize the authentication device.

FIG. 5A depicts a flow chart of one embodiment of an initialization operation 200 to initialize the authentication device. During the initialization operation, the authentication device generates 202 authentication private and public keys. The authentication device then sends 204 the public key to the trusted party. Upon receiving 206 the public key, the trusted party places 208 the public key in a certificate and sends 210 the certificate back to the authentication device. The authentication device receives 212 and stores the authentication public key certificate. The trusted party makes sure that no further initialization operations are possible after this. From that point onwards the only operations that can be performed by the authentication device (configuration and authentication) are controlled by the trusted party. The methods and security mechanisms used to perform this initialization operations may be of little or no importance, in some embodiments, and are typically agreed to between the manufacturer and the trusted party. Other embodiments may include fewer or more operations.

Figure 5B:
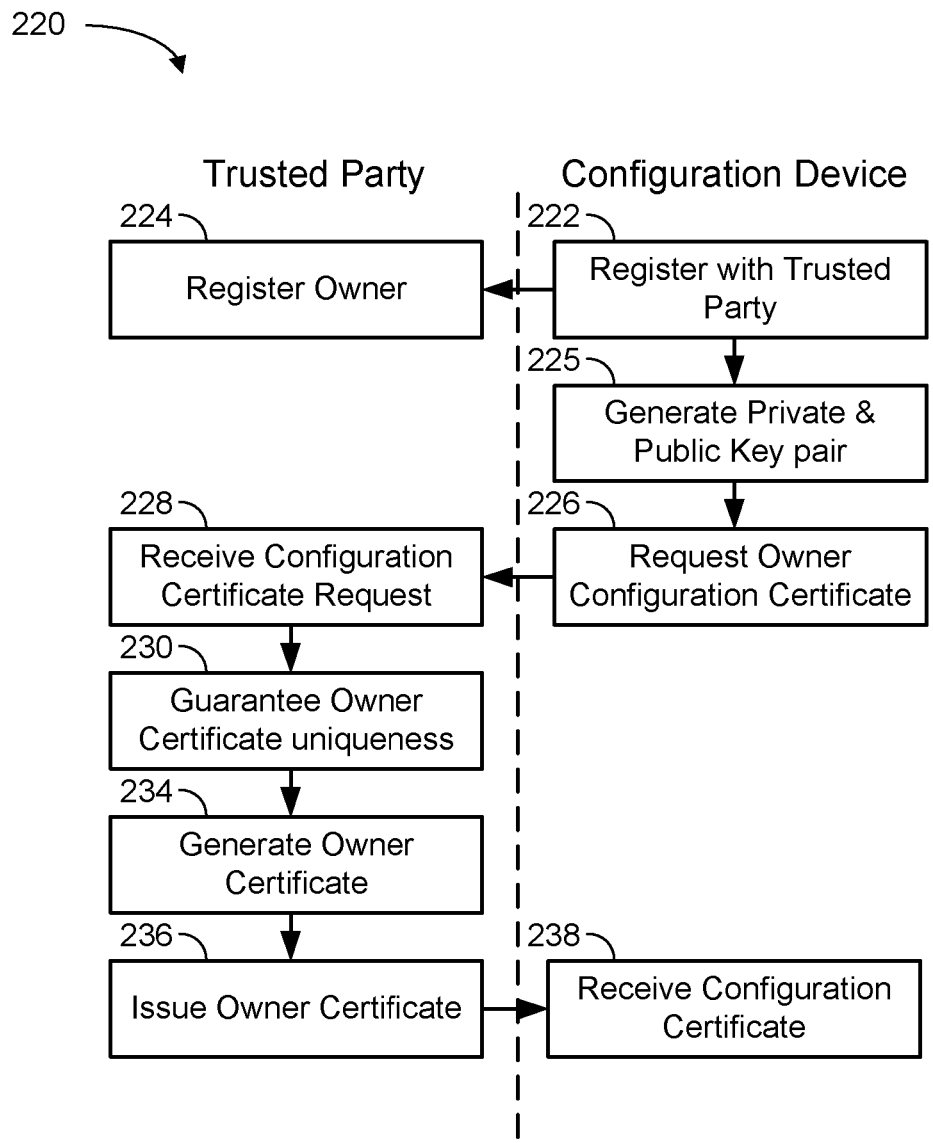
FIG. 5B depicts a flow chart of one embodiment of another initialization operation to initialize the configuration device.

FIG. 5B depicts a flow chart of one embodiment of another initialization operation 220 to initialize the configuration device. In some embodiments the brand owner registers 222 and 224 with a trusted party. The brand owner also generates 225 a public/private key pair for the configuration device and requests 226 and 228 an owner configuration certificate from the trusted party. The trusted party will issue 236 an owner certificate containing a public key and owner information. The trusted party guarantees 230 the uniqueness of the owner information, meaning it has never issued an owner certificate with the same owner information before and that it will never do so in the future. It guarantees the uniqueness of the owner information for all certificates it has ever generated and will ever generate. There are several different possibilities to guarantee the uniqueness of the owner information, depending on what information is contained within it. The trusted party also generates 234 an owner certificate and issues 236 and 238 the certificate to the configuration device. The public key contained in the certificate corresponds to a private key that is owned by the owner. There are several methods to assure that the trusted party obtains the public key and that after the procedure the owner has the private key and corresponding public key certificate. This will also be discussed separately. In one embodiment, this procedure is executed only once for each unique piece of owner information.

Figure 6:
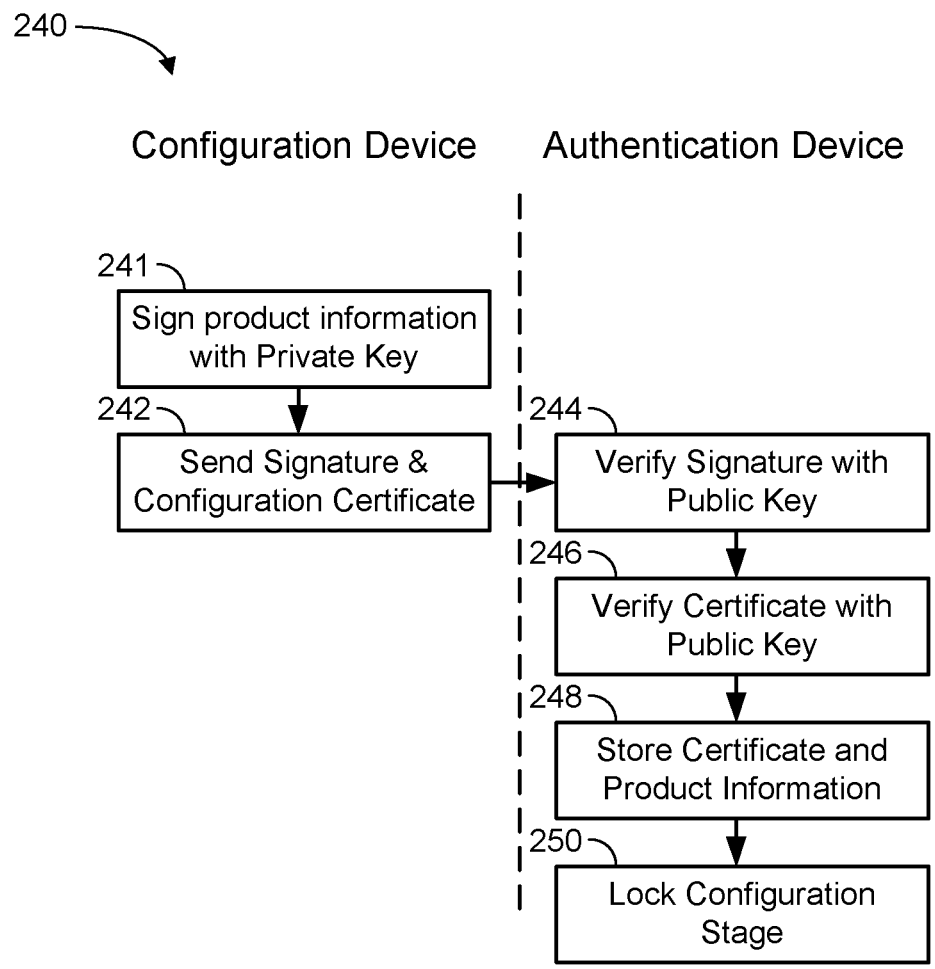
FIG. 6 depicts a flow chart of one embodiment of a configuration operation.

FIG. 6 depicts a flow chart of one embodiment of a configuration operation 240. During the configuration operation 240 the brand owner can add brand and product information to the authentication device. In the illustrated operation 240, the owner signs 241 and sends 242 a configuration string containing the product information with the private key corresponding to the brand owner configuration certificate and sends this to the authentication device together with the brand owner configuration certificate. The signature may include a field that guarantees the signed message can only be used for a specific device (e.g., a unique device identifier or a challenge received from the device).

The authentication device receives and verifies 244 the signature using the public key in the brand owner configuration certificate. It verifies that the message was not intended for a different authentication device by checking the field included for this in the signature. It then verifies 246 the brand owner configuration certificate using the public key from the trusted party root configuration certificate. If both operations are successful the brand owner information from the brand owner configuration certificate and the product information from the signature are permanently stored 248 in the authentication device. It is recommended that the authentication device is (automatically or manually) locked 250 for further configuration after this operation.

In some embodiments, the uniqueness of the brand owner information can be guaranteed in different ways by the trusted party, each with its own properties. In one example, the brand owner information contains a unique identifier that is generated by the trusted party. This method requires that the link between the brand owner and the unique identifier can be established and verified by the host. There are several realistic use-cases in which this link can be established. For example, the host may be provided by or under the control of the brand owner. As another example, the brand owner publishes its identifier in an easy to verify way such as, for example, on an authenticated web page.

In this embodiment, the trusted party does not have to perform any checks before it assigns an identifier to a brand owner. The brand owner is responsible for assuring the link between itself and its Identifier can be established.

In another embodiment, the brand owner identification contains a text representation of the brand owner, its brand name, or other trademark the brand owner wants to be verifiable. In this case the trusted party needs to assure that the brand owner information is related to the brand owner (e.g., does not violate trademarks, brand names . . . of other brand owners) and will not be issued to another brand owner afterwards. In this embodiment, the host obtains a piece of human readable brand owner information which it knows to be genuine through challenge-response protocol and the verification of the certificate chain. This is particularly useful if the host is conceived to display this information to a human as a proof of product authenticity.

Several other embodiments are also possible. For example, an embodiment could use human readable brand owner information that is digitally signed by a notary or other trusted (official) third party. Another possibility is that a trusted party immediately issues a brand owner certificate containing an identifier but publishes this identifier and linked brand owner data only after it has performed verification. This could be done, for example, by publishing a list containing the Identifiers and Corresponding Brand Owners on an authenticated web page.

In regard to the public-private key pair, the public-private key pair can be generated in several different ways. Depending on who generates these keys, the public key, private key, or both may need to be transmitted to the trusted party and/or brand owner.

In one embodiment, the trusted party generates the public-private key pair. In this case the trusted party can generate the certificate for the public key as soon as it has received/generated the brand owner information. It then sends the certificate and the secret key to the brand owner in a secure way (e.g., over a secured channel).

In another embodiment, the brand owner generates the public-private key pair. In this case the brand owner may need to send its public key to the trusted party (possibly in addition to its brand owner information). The trusted party can then generate the brand owner certificate and send it back to the brand owner. Sending this certificate does not require a secure connection.

With this technique, the standard methods used by certification authorities can be used. The public key can be sent to the trusted party using a certificate request. This certificate request does need an additional required field for the brand owner identification if this is supplied by the brand owner. The brand owner certificate generation will also be very similar to the generation of standard internet certificates however taking the brand owner information into account.

Any other method to communicate the public key to the trusted party, to generate the brand owner certificate and to communicate it to brand owner also remains possible.

An embodiment of this method could be that the trusted party provides the brand owner with a software tool that collects the brand owner information if required by the trusted party, generates a public private key pair for this brand owner, sends the public key to the trusted party and retrieves the brand owner certificate back from the trusted party. After running the software tool just once the brand owner will have everything he needs to configure the authentication devices embedded in its products.

Figure 7:
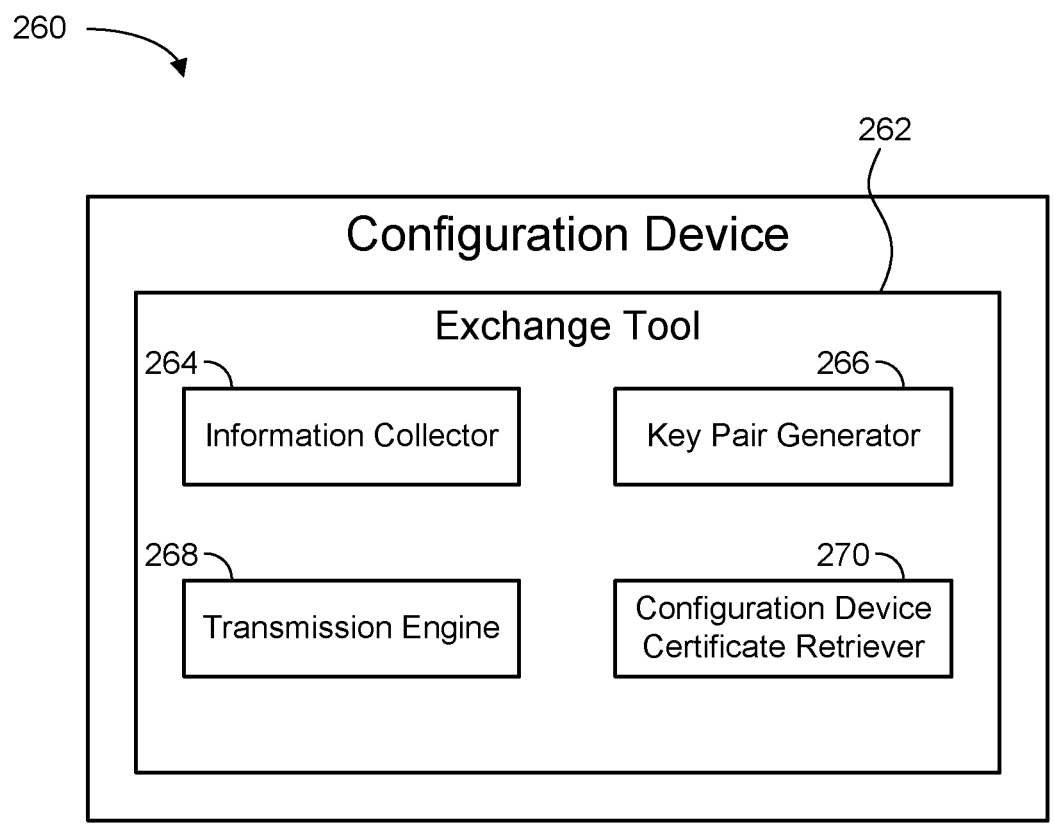
FIG. 7 depicts a block diagram of one embodiment of a configuration device.

FIG. 7 depicts a block diagram of one embodiment of a configuration device 260 which may be implemented, at least partially, as a software exchange tool 262, as described above. The illustrated exchange tool 262 includes an information collector 264, a key pair generator 266, a transmission engine 268, and a configuration device certificate retriever 270 to perform the operations described above and elsewhere herein.

Figure 8:
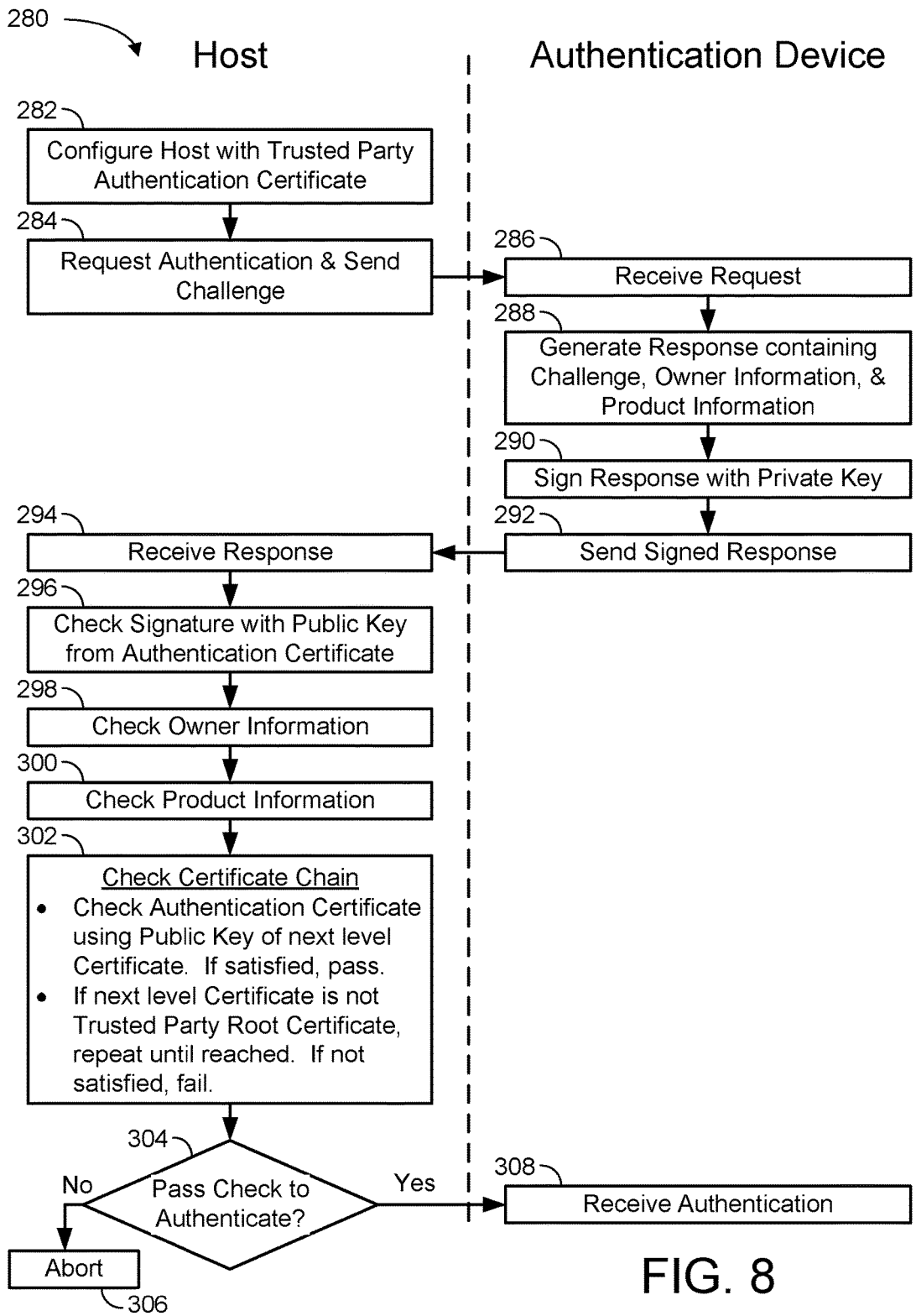
FIG. 8 depicts a flow chart of one embodiment of an authentication operation.

FIG. 8 depicts a flow chart of one embodiment of an authentication operation 280. During the authentication operation the authentication device proves to a host that it is authentic. In order to do this, the authentication device sends the brand owner information and product information to the host in an authenticated way.

Before a host performs authentication operations, the host is configured 282 with the trusted party authentication root certificate. This certificate is not secret but it needs to be protected against modification. Any conventional method that fulfills this requirement can be used to prevent modification.

In one embodiment, the authentication operation 280 is performed beginning with the host issuing 284 an authentication request containing a challenge to the authentication device. The authentication device receives 286 the request and challenge. In response, the authentication device constructs 288 a response message containing this challenge, the brand owner information, the product information and other optional fields and signs this response message with its private key. Other embodiments may include less or more information. The authentication device signs 290 the response and sends 292 this signed response back to the host, together with all the optional intermediate authentication certificates present in the authentication certification chain.

The host receives 294 and verifies the response. In one embodiment, the host performs a series of operations to facilitate the verification. For example, in one embodiment, the host checks 296 the signature with the public key from the device authentication certificate, checks 298 if the brand owner information is correct for the product, and checks 300 if the product information is correct for the product. The host then checks 302 the certificate chain up to the trusted party authentication root certificate. As part of checking the certificate chain, the host may verify 302 the device authentication certificate using the public key of the next level certificate. If the next level certificate is the trusted party authentication root certificate, then the process stops here and the certificate chain is verified. However, if the next level certificate was an intermediate authentication certificate, this certificate is verified using the public key of the certificate above it. This process repeats until the trusted party authentication root certificate is reached.

The host determines 304 if any of the checks fails the procedure and, if so, aborts 306 and the product authentication fails. Otherwise, if all the steps are successful, then the trusted party will have certified 308 through all the intermediate certificates and the device authentication certificate that the private key of the authentication device is genuine and, therefore, the authentication device itself is genuine.

Because the trusted party also strictly controls the brand owner information and the brand owner's capability to add product information, in some embodiments the brand owner and product information are also certified by the trusted party, proving the product is genuine (authentic).

In further embodiments, when the public key of the trusted party is signed by a key that belongs to another PKI, the trust from this PKI is inherited through the whole authentication certificate chain. This allows merging trusted parties or creating authentication systems with multiple trusted parties who share a common root of trust. It can extend the use of the challenge-response mechanisms to other applications such as secure login on web interfaces or any other application that relies on PKI infrastructures for authentication.

Figure 9:
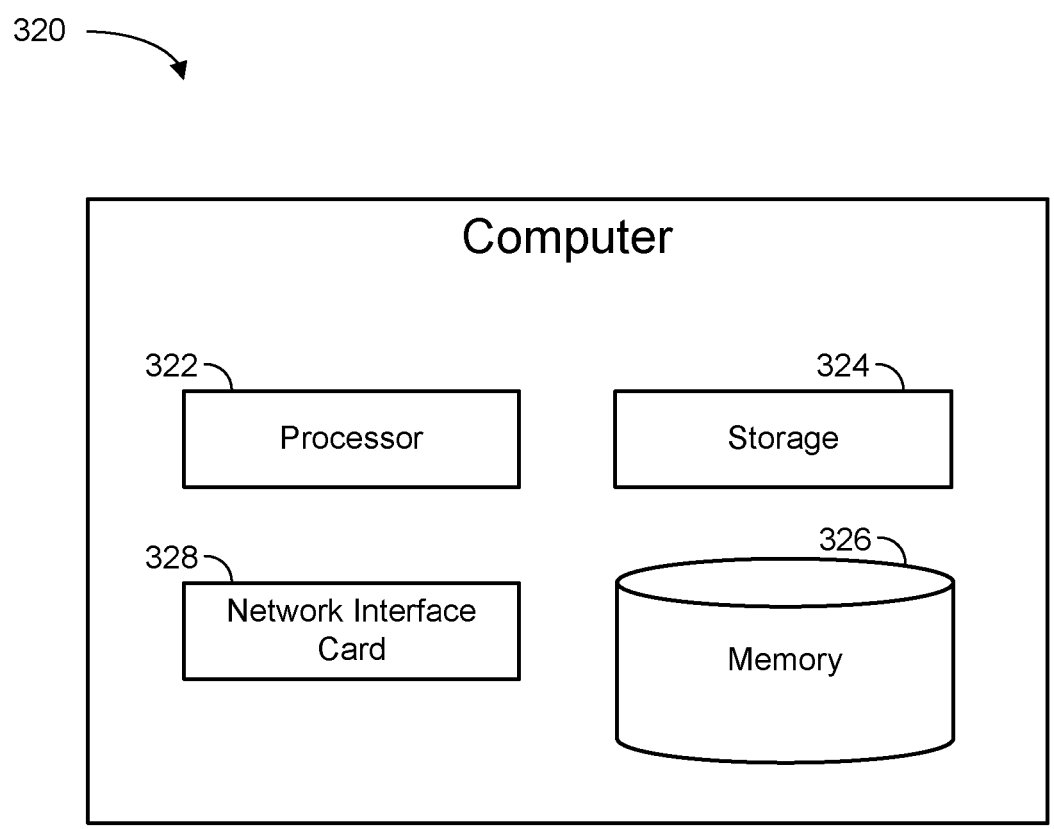
FIG. 9 depicts a block diagram of one embodiment of a computer.

FIG. 9 depicts a block diagram of one embodiment of a computer 320. The illustrated computer 320 is generally representative of any electronic computing device, regardless of size or functional resources. The illustrated computer 320 includes a processor 322, a data storage device 324, a memory device 326, and a network interface card (NIC) 328 (or other communication connection functionality).

In some embodiments, input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

A lightweight certificate format based on a lightweight signature scheme offers message recovery but does not rely on a one way transformation or hash as is typical in conventional schemes. This allows the signature method to be implemented with less program code or hardware since no hash function has to be provided. Furthermore the certificate format is compact enough so that it can be fully recovered from the signature and only contains the minimal amount of meta-data making it easy to parse.

When a signature scheme with message recovery is used the length of the authentication (response) payload can be significantly reduced by including the brand information and product information in the recoverable message. This way these fields need not be sent in addition to the signature.

The challenge does not need to be sent back with the signature since it was originally sent by the host anyway. (This applies to all signature schemes, not just those with message recovery.)

Advantages of some embodiments of the lightweight format include a relatively low number of bytes to execute the process of encoding, the relative ease of parsing due to a minimal amount of meta-data, and elimination of the hash function to reduce processing and other requirements. Other embodiments also have the advantage of being able to fully recover data.

Figure 10:
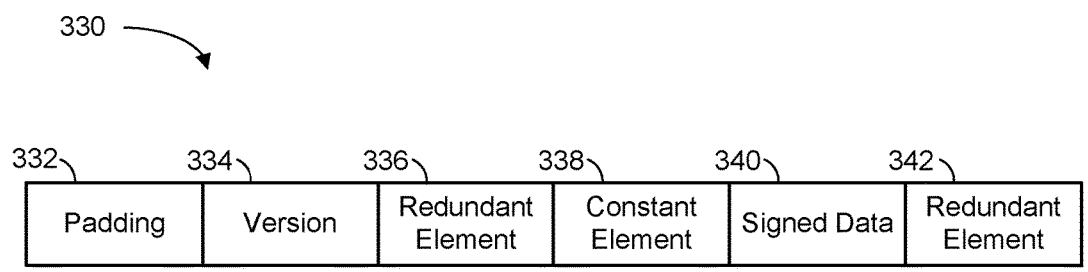
FIG. 10 depicts a block diagram of one embodiment of a signature creation engine.

FIG. 10 depicts a block diagram of one embodiment of a signature creation format element 330. The signature is created by applying an RSA encryption with the private key to the element 330. The element 330 is formatted to include padding 332, version 334, redundant element 336, constant element 338, signed data 340, and redundant element 342. Specifically, in the illustrated embodiment, the portions of the element 330 are as follows:

Padding 332: The first N most significant bits of the formatted data element. N and the value of padding 332 must be chosen such that the numerical value of the formatted data element 330 is strictly smaller than the numerical value of the RSA modulus. In the exemplary embodiment N is chosen to be 12 bits, where the total length of the formatted data element 330 is a multiple of 8 bits. The numerical value of padding 332 is chosen such that it is the largest possible numerical value which results in a numerical value of the formatted data 330 to be smaller than the RSA modulus Version 334: In the exemplary embodiment the version 334 is a fixed 4 bit value Redundant element 336: In the exemplary embodiment the redundant element 336 is a random number of 4 bytes which is repeated twice in formatted data.

Constant element 338: In the exemplary embodiment the constant element 338 is a 4 byte constant value.

Signed data 340: the signed data 340 is of fixed length namely the length of the RSA modulus in bits rounded up to the first multiple of 8 minus 14*8 bits.

Redundant Element 342: In the exemplary embodiment of the element 330, the redundant element 342 is similar in function and description to redundant element 336.

The relative positions of all elements except the Padding can be changed as well as the length of the fields provided the total length remains equal to the total length of the RSA modulus in bits rounded up to the first multiple of 8. Version, constant element and redundant element are all redundantly encoded elements. More or less redundantly encoded elements may be included provided that the conditions stated above remain fulfilled. The total length of the redundantly encoded elements is an important security parameter.

In some embodiments, the signature can be verified by applying an RSA encryption with the public key to it and verifying if the formatted data element has the correct formatting. In the exemplary embodiment this includes verification of the constant value and version, verification of the redundant element against the other redundant element, and verification that the padding is the largest possible value as described above. Other embodiments may include fewer or more elements or more or less functionality in each of the elements of the signature creation format element 330.

Figure 11:
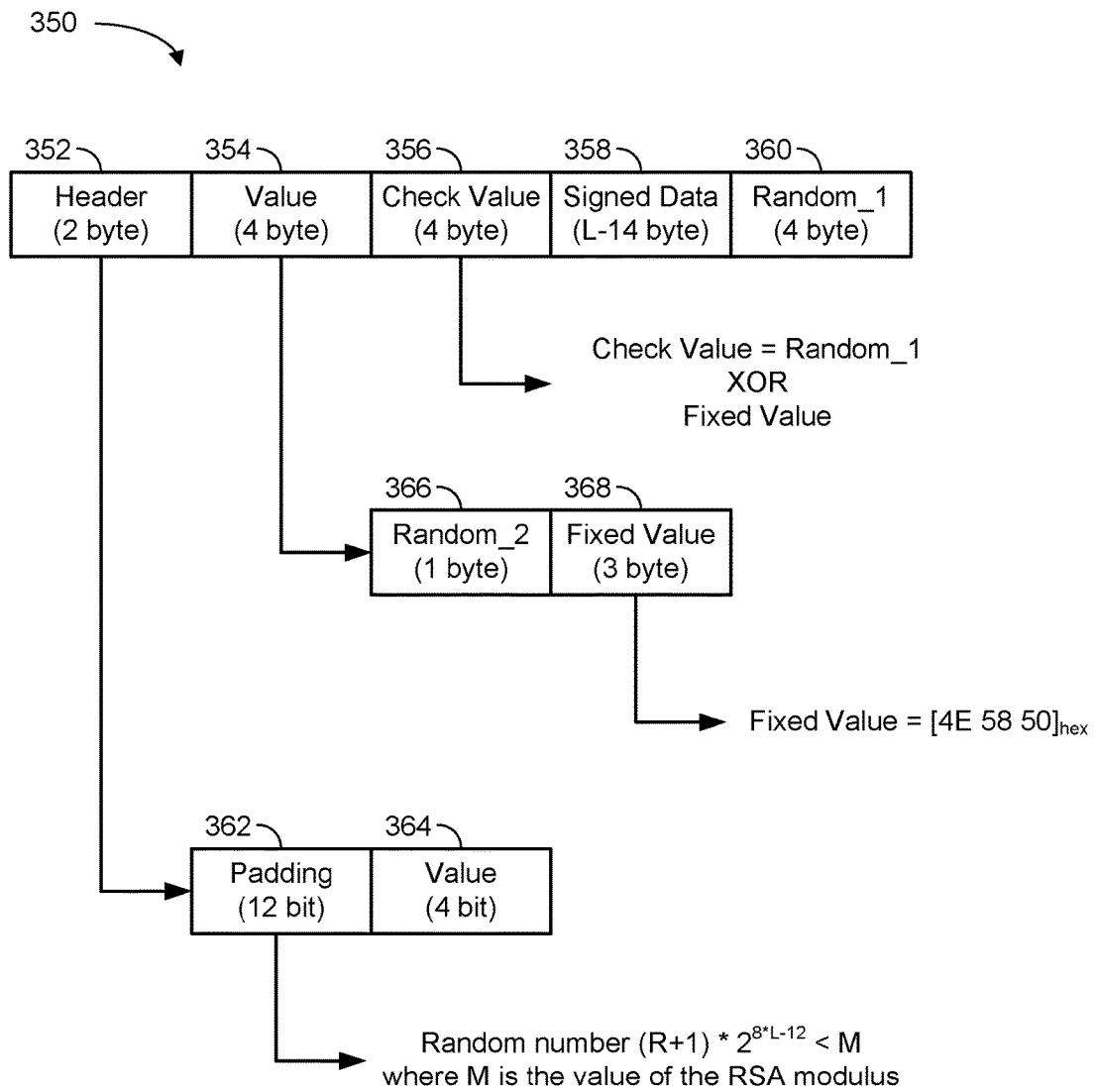
FIG. 11 depicts a block diagram of one embodiment of a signature formatting scheme.

FIG. 11 depicts a block diagram of one embodiment of a signature formatting scheme 350. The purpose of the data formatting is to transform a data input (message) into a form that can be directly used by the RSA private operation and inserting redundancy that can be used during the verification process to ensure a signature is valid.

The data formatting process takes L−14 bytes of data as input and transforms it into L bytes of output data as depicted in FIG. 11, where L is the length in bytes of the RSA modulus M. The check value and fixed value allow the verification process to detect if the signature is correct and valid. The purpose of the header is to guarantee that the numerical interpretation of the formatted block is strictly smaller than the RSA modulus.

Specifically, the illustrated embodiment of the signature formatting scheme 350 of FIG. 11 includes header 352, value 354, check value 356, signed data 358, and random_1 360. Also, the header 352 follows into padding 262 and value 364. In one embodiment, padding 362 facilitates a random number (R+1)*28*L−12<M, where M is the value of the RSA modulus. The value 354 follows to random_2 366 and fixed value 368. In one embodiment, the fixed value 368 is of the format [4E 58 50]hex.

In the illustrated embodiment, exemplary byte counts and sizes are given. In other embodiments other sizes and quantities may be used.

Figure 12:
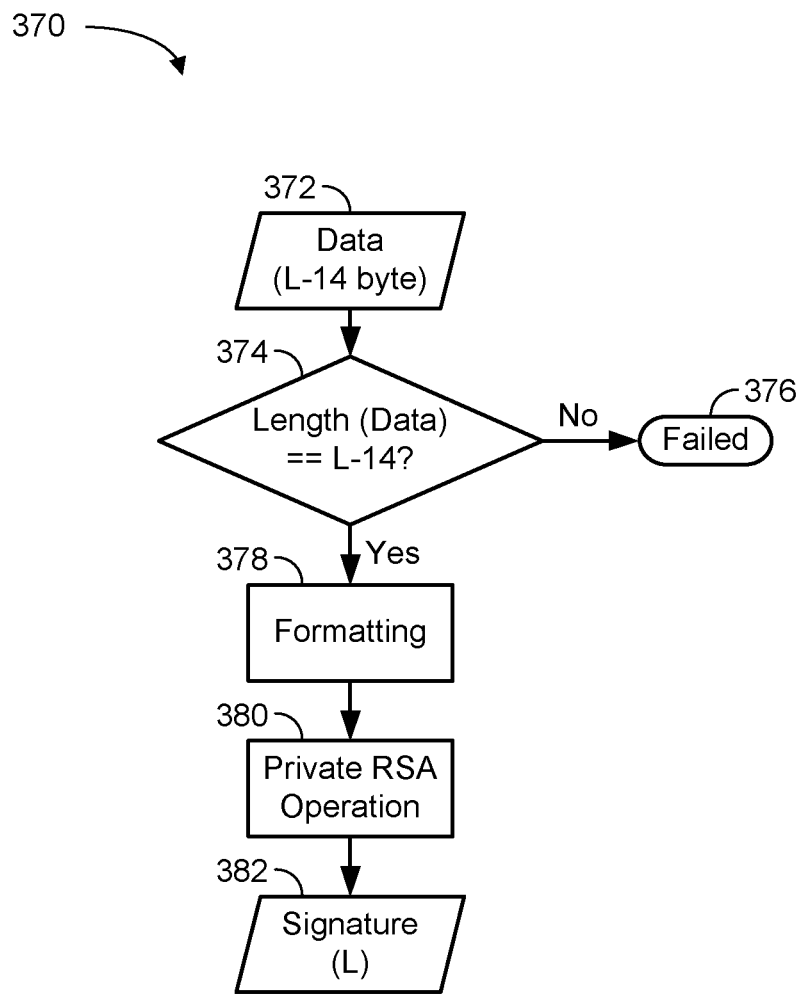
FIG. 12 depicts a flow chart of one embodiment of signature generation.

FIG. 12 depicts a flow chart 370 of one embodiment of signature generation. Specifically, the flow chart 370 starts with data 372. The data is checked 374 for length. If failed, the process is terminated 376. If not, the flow chart proceeds to formatting 378 and on to private RSA operation 380. Finally, the signature 382 of length L results.

Basically, the signature generation flow 370 checks if the input has the correct length, applies formatting to it and then performs an RSA exponentiation with the private key on the formatted input. Other embodiments may execute the above processes in a different order or with more or less functionality.

Figure 13:
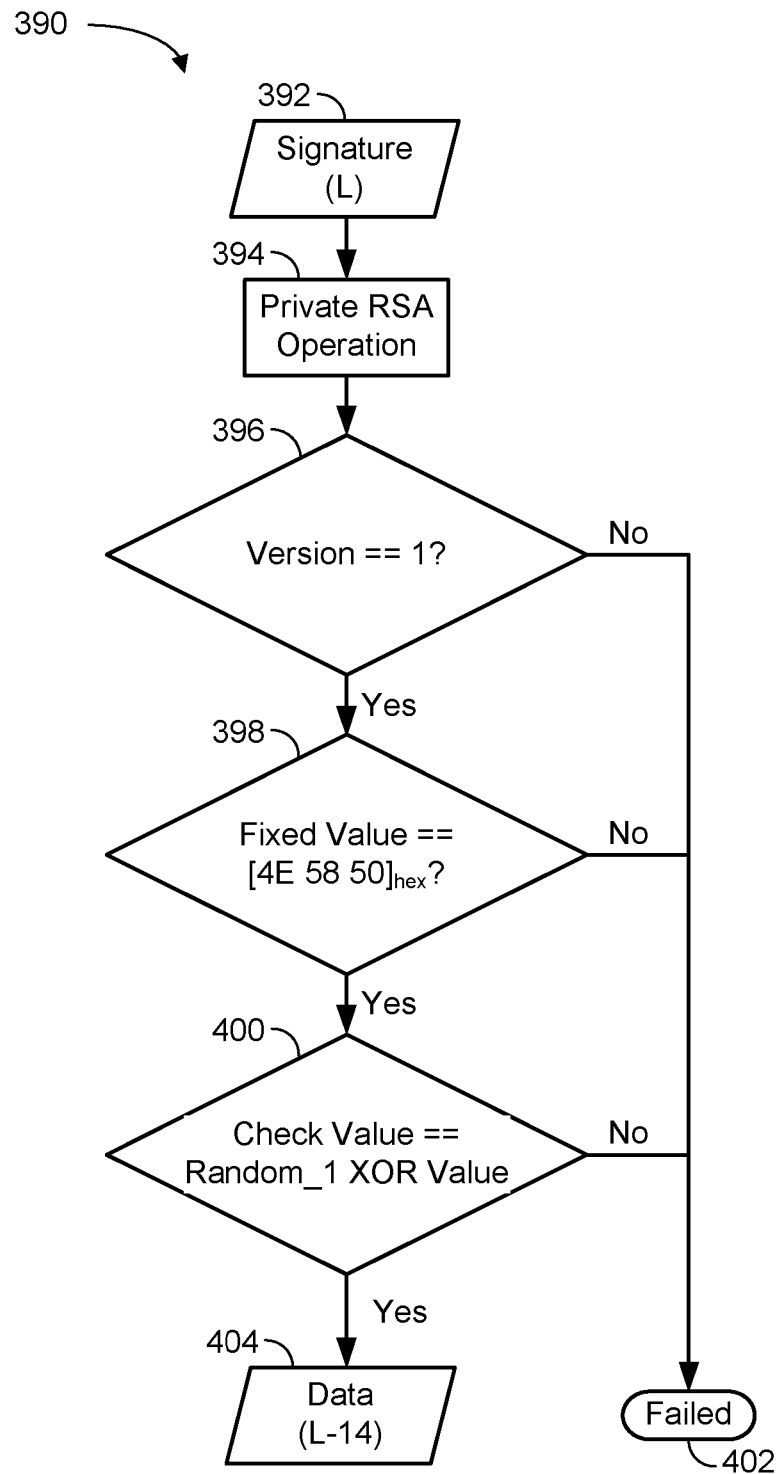
FIG. 13 depicts a flow chart of one embodiment of signature verification.

FIG. 13 depicts a flow chart 390 of one embodiment of signature verification. The signature verification, as depicted in FIG. 13, takes the signature 392, performs an RSA operation 394 with the public key on the input and then verifies the version number 396, the fixed value 398, and the check value 400. If any of these checks fails, the verification fails 402, otherwise the data (message) recovered from the signature is returned 404.

Figure 14:
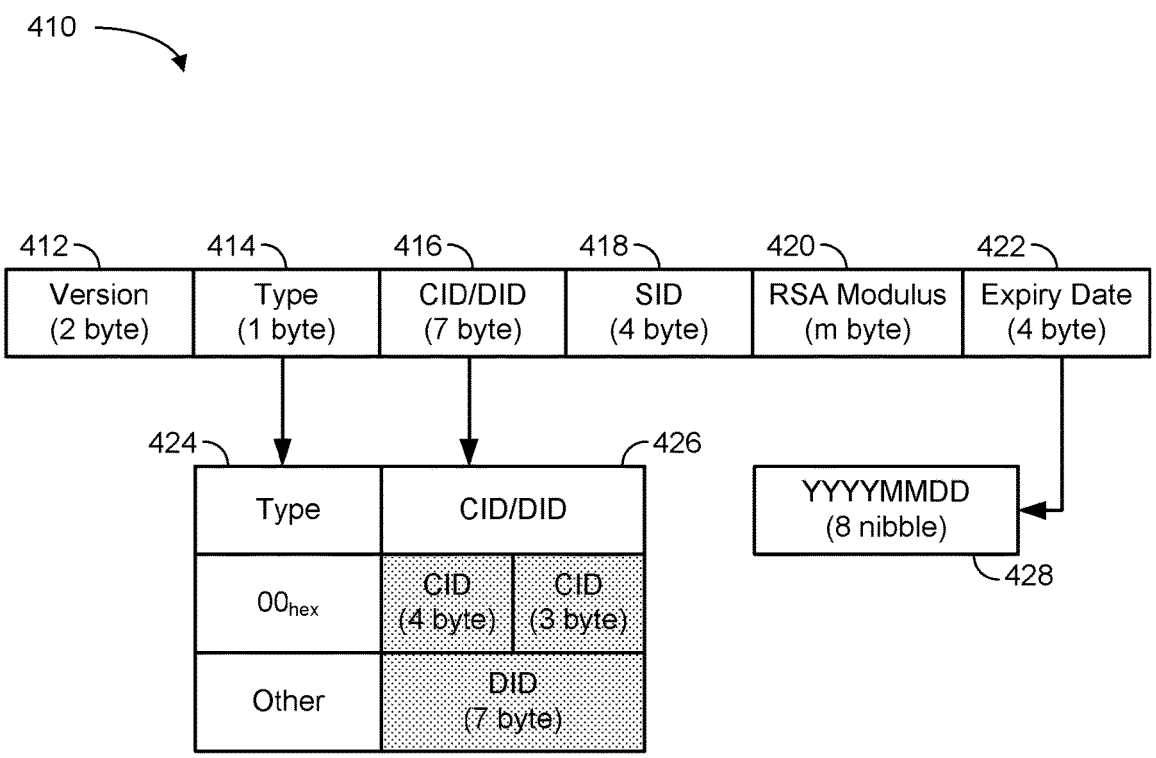
FIG. 14 depicts a block diagram of one embodiment of a certificate formatting scheme.

FIG. 14 depicts a block diagram 410 of one embodiment of a certificate formatting scheme. The illustrated embodiment includes version 412, type 414, CID/DID 416, SID 418, RSA modulus 420, and expiry date 422. Additionally, the illustrated embodiment includes a type column 424, a CID/DID column 426, and a date format 428. The purpose of the certificate formatting is to encode a public key into a form that can be used by the lightweight signature operation and to insert additional fields that are required to determine the validity and permitted use during the verification process. In one embodiment, the certificate formatting process takes an RSA modulus 420 of at most m bytes, applies padding to this modulus until its length is exactly m bytes, and then inserts it into a structure of L−14 bytes. The maximum length m of the modulus that can be signed by a signing key of length L is m=L−32.

For reference, various certificate fields are identified and listed in Table 1 below. Similarly, various certificate types are identified and listed in Table 2 below.

TABLE 1

Lightweight Certificate Fields.

| Field | Description |
| --- | --- |
| Version | The version of the certificate format. It shall be set to $0001_{hex}$. |
| Type | The type of certificate. The supported certificate types are listed in Table 2 below. |
| CID | Certificate IDentifier: unique identifier of the Certificate (only for Type = $00_{hex}$) |
| DID | Device IDentifier: unique identifier of the Authentication Device (only for Type ≠ $00_{hex}$) |
| RFU | Reserved for Future Use: this field shall be set to $000000_{hex}$ |
| SID | Signer IDentifier: unique identifier of the signer's certificate |
| RSA Modulus | The modulus of the RSA key. It is encoded as an MSB-first byte array, padded with 0 at the MSB (left) side until it is exactly m byte long. |
| Expiry Date | The expiry date of the certificate. The certificate is valid up to and including this date. The certificate expires at 00:00:00 GMT of the next day. The Expiry date is encoded as a sequence of 8 nibbles of 4 bit each, organized into 3 groups: Year (4 nibble), Month (2 nibble) and Day (2 nibble). Example: February 11th 2010 is encoded as 20100211hex |

TABLE 2

Lightweight Certificate Types.

| Type | Description | Notes |
| --- | --- | --- |
| $00_{hex}$ | CA certificate | This certificate can be used to verify certificates |
| $01_{hex}$ | Product Authentication | This certificate can be used to in a challenge-response protocol to generate a proof of authenticity for a product. |

TABLE 2-continued

Lightweight Certificate Types.

| Type | Description | Notes |
|---|---|---|
| $02_{hex}$ | Configuration | This certificate can be used to enable configuration options on the authentication device. |
| $03_{hex} \ldots FF_{hex}$ | RFU | Reserved for future use. |

Figure 15:
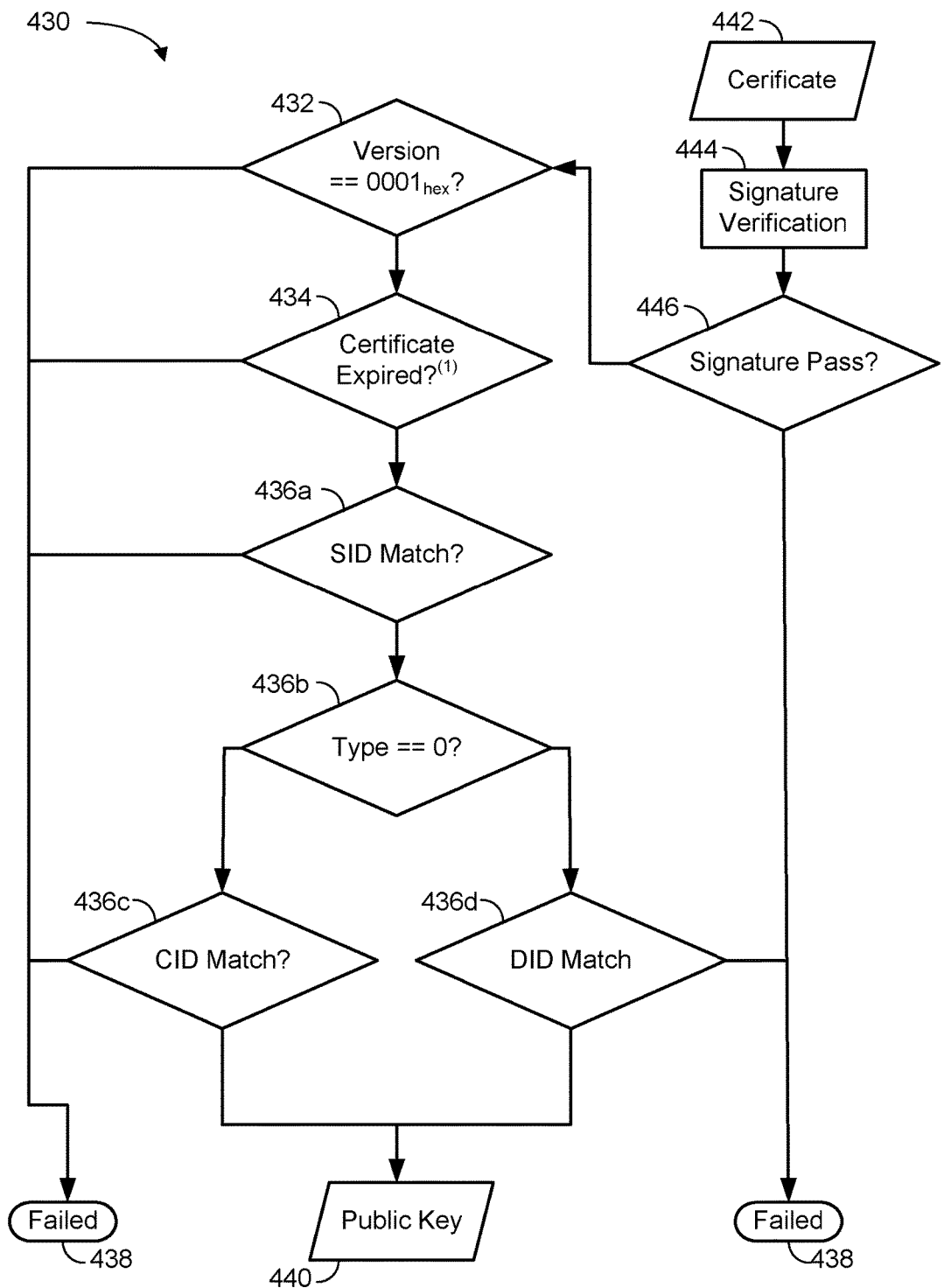
FIG. 15 depicts a flow chart of one embodiment of certificate verification.

FIG. 15 depicts a flow chart of one embodiment of certificate verification. In one embodiment, the certificate verification involves signature verification as described above with reference to FIG. 13. The certificate verification also then verifies the version number 432, the expiry date 434, and the CID/DID 436a-d. If any of these checks fails, then the verification fails 438. Otherwise, the public key 440 recovered from the signature is returned.

In some embodiments, the use of lightweight certificates imposes one or more restrictions on the public key infrastructure (PKI). Although these restrictions impose limits on the flexibility in the design of the PKI hierarchy, they do not present security concerns. In fact, some of the restrictions imposed on the design of the PKI hierarchy are generally considered good practice. Some examples of the types of restrictions that may be imposed on the PKI hierarchy include restrictions related to the length of the signing key, the length of the certificate chain, the use of self-signed certificates, and the public exponent.

The use of lightweight certificates imposes a PKI hierarchy that is strictly ordered according to key length. In some embodiments, the key used to sign a lightweight certificate must always be 32 bytes longer than the key that is being signed. This is due to the fact that the signed key is recovered from the certificate, and the signature 444 and certificate 442 contain some additional data that is needed for security 446. This restriction is of no concern to security since it is in general a good practice to use a key for signing certificates that is longer than the keys contained in the certificates.

The increase in the length of the keys used by the certificate authorities imposes a practical restriction on the length of the certificate chain since longer RSA keys require more resources (e.g., memory, processing time) for the verification. The length of the certificate chain will, in general, have a much higher impact on the amount of resources required to verify a certificate chain. It is possible to reduce the length of the certificate chain rather than compromise on the security of the shortest key in the chain. In some embodiments, a PKI architecture for a lightweight authentication application uses no more than two or three certificate verifications at most.

In some embodiments, it is not possible to generate self-signed certificates with the lightweight signature scheme. This is a consequence of the fact that the signing key has to be longer than the signed key. It should be noted that from a security point of view a self-signed certificate only provides error detection. If it is replaced by another self-signed certificate, then the host will have no means of detecting this. Hence, the host is responsible for protecting the integrity of the root public key, independently of whether it is stored in a self-signed certificate or not.

In some embodiments, the certificates do not contain the value of the public exponent of the RSA public key. This value may be determined by another method. There are several possible methods that can be used for this, including fixing the value of the public exponent to a value that is used for all public keys in the system, and encoding the value of the public exponent in the DID/CID field of the certificate. A few bits of the DID/CID could be reserved to select a public exponent from a list of fixed values, or a public exponent could be derived algorithmically from the value of the CID/DID field. In case of a certification authority certificate, the reserved (RFU) bits could be used as well.

In most PKI systems, fixing the value of the public exponent or selecting it from a short list of fixed values will be possible. It is possible, in some situations, that the public exponent cannot be encoded with sufficient flexibility when existing keys need to be re-used. However, in most existing PKI systems the public exponent is already set to the de-facto standard value of 65537.

The lightweight challenge-response protocol can be used by a host to authenticate an authentication device when given a trusted public key. It is not concerned with establishing this trust and therefore assumes that the host has already verified the authentication device's public key certificates or is able to do so when needed.

The host initiates the challenge-response protocol by sending a challenge to the authenticator device. The authentication device then formats this challenge into a fixed structure and applies a signature on the formatted challenge to produce the response. The host then verifies the response by performing a signature verification operation using the trusted public key and verifying that applied formatting and challenge are correct. In some embodiments, the challenge-response protocol provides the possibility to obtain an authenticated data string from the response that can be used to establish the authenticity of a product.

Figure 16:
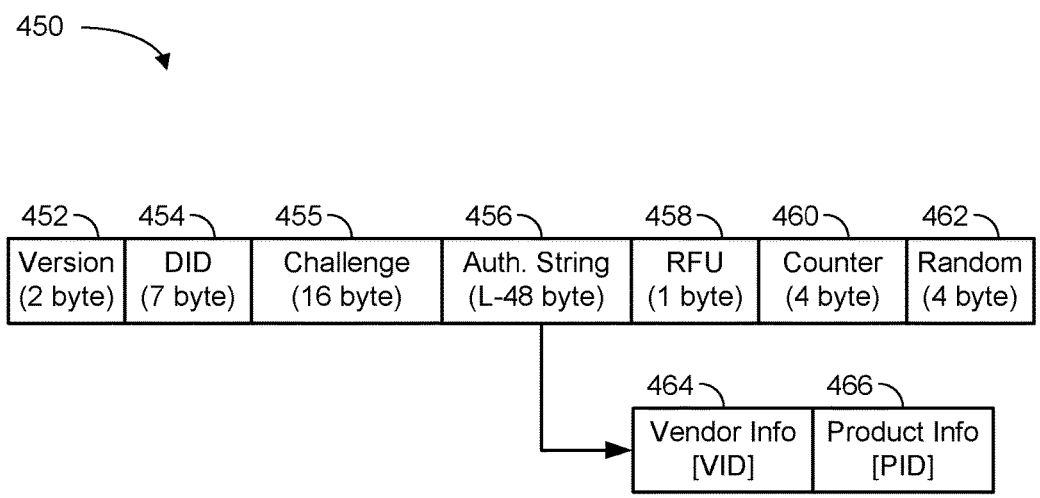
FIG. 16 depicts a block diagram of one embodiment of a challenge-response formatting scheme.

FIG. 16 depicts a block diagram 450 of one embodiment of a challenge-response formatting scheme. The illustrated formatting scheme includes a version field 452, a device identifier (DID) field 454, a challenge field 455, an authenticated string field 456, an (RFU) field 458, a counter field 460, and a random number field 462. In the illustrated embodiment, the authenticated string field 456 includes a vendor information field 464 and a product information field 466. Each of these fields is configured to store a corresponding data value representative of a portion of a challenge response. In other embodiment, some or all of the fields described herein may be reordered or have different allocated sizes.

A potential purpose of the data formatting is to transform the challenge into a form that can be directly used by the signing operation and inserting additional fields that can be used during the verification process to prove device and product authenticity. In this way, a hash function is not necessary.

In one embodiment, the data formatting process creates an L–14 bytes long output from the fields, where L is the length in bytes of the RSA modulus M of the signing key. Besides the challenge, the formatted data also may contain the device identifier (DID) and an authenticated string. The DID is used to bind the response to the authentication device, and the authenticated string makes it possible to convey product specific information (e.g., brand, model . . . ) to the host that is authenticated by the signature. The counter provides a possibility to improve the binding to the host by maintaining a synchronized counter, and the random provides additional entropy making attacks on the cryptogram more difficult.

Figure 17:
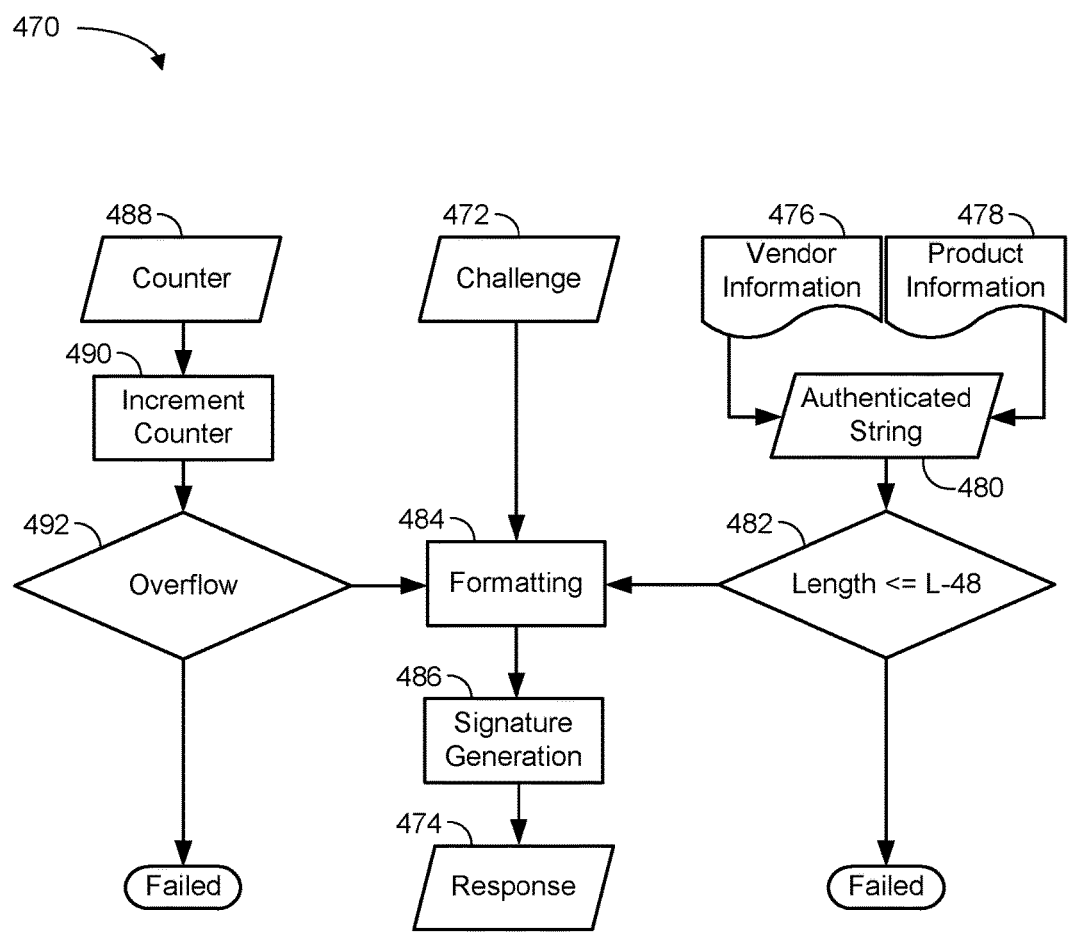
FIG. 17 depicts a flow chart of one embodiment of response generation.

FIG. 17 depicts a flow chart 470 of one embodiment of response generation. When the tag receives a challenge 472, it processes the challenge according to the depicted procedure 470 to produce a response 474. In one embodiment, the response generation procedure starts by combining the vendor information 476 and the product information 478 into a string that will form the authenticated string 480 once the response is computed. The length of the string is checked 482 to assure it does not exceed the available maximum length of L−48 bytes. If the string passes the checks, then the string is inserted into the formatting routine 484 that will add padding on the left side until the string is exactly L−48 byte long. In one embodiment, the padding value used is 00hex.

The response generation procedure also increments 490 the counter 488 and checks 492 for overflow. The incremented counter value 488, the challenge 472 and other fields then may be inserted into the formatting routine 484 to produce a formatted data block. The formatted data block is then signed 486 to produce the response 474.

Figure 18:
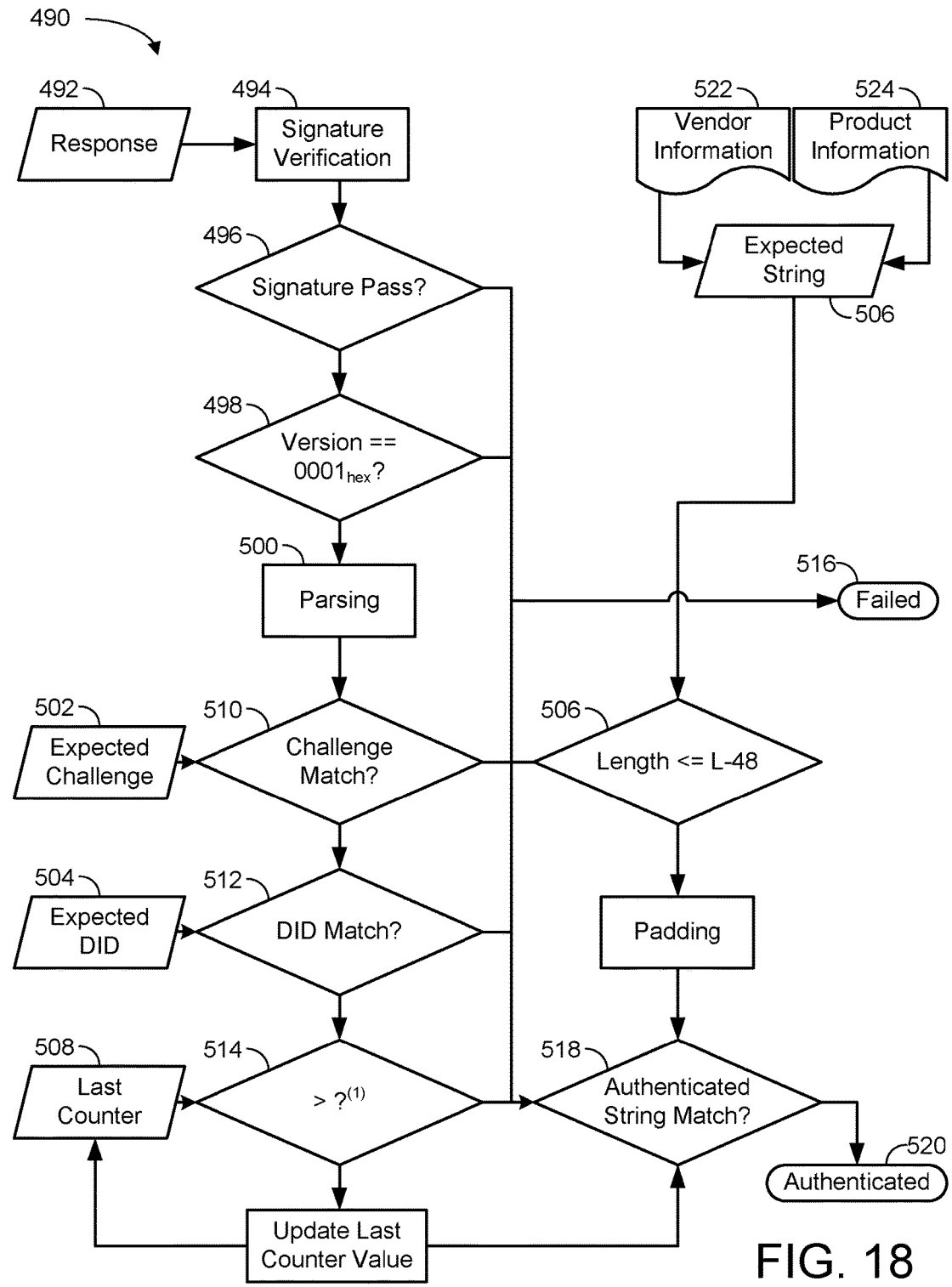
FIG. 18 depicts a flow chart of one embodiment of response verification.

FIG. 18 depicts a flow chart 490 of one embodiment of response verification. In the illustrated embodiment, a response 492 is received and the signature 494 is verified. If it is determined 496 that the signature is okay, then a version is checked. If it is determined 498 that the version is okay, then the response is parsed 500 to access data in the various fields of the response. The various fields are then compared against expected values (e.g., expected challenge 502, expected DID 504, expected length 506, counters 508, etc.). If it is determined 510, 512, and 514 that the signature, version, or other expected value does not match, then the response verification fails 516. Otherwise, an authenticated string match 518 is identified, and the response verification is successful 520. In some embodiments, the vendor 522 and product information 524 (or other configuration information) is also verified as part of the response verification procedures.

An embodiment of a system includes at least one processing device coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. In specific embodiments, the functionality described herein may also be implemented using software, stored on a physical storage device (e.g., a computer readable storage medium), for execution by various types of processors. Examples of a computer-readable storage medium include, but are not limited to, a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices which are referred to herein as computer readable media.

In some embodiments, the software portions are stored in a non-transitory state such that the software portions, or representations thereof, persist in the same physical location for a period of time. Additionally, in some embodiments the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An authentication method comprising:
   storing a device authentication private key on an authentication device;
   storing a device authentication public key certificate linked to a trusted authentication root certificate on the authentication device, wherein the device authentication private key and the device authentication public key certificate facilitate authentication of the authentication device to a verification device according to a device authentication protocol; and
   storing a configuration root certificate on the authentication device, wherein the configuration root certificate facilitates authentication of a configuration device to the authentication device according to a configuration authentication protocol, wherein the device authentication protocol and the configuration authentication protocol use two separate certificate chains that both originate from a trusted party as a root of trust.

2. The authentication method of claim 1, further comprising:
   receiving, at the authentication device, a configuration public key certificate from the configuration device; and
   determining, at the authentication device, whether the configuration device has a configuration private key corresponding to the configuration public key certificate.

3. The authentication method of claim 2, further comprising:
   receiving, at the authentication device, a configuration parameter from the configuration device; and
   storing the configuration parameter on the authentication device in response to a determination at the authentication device that the configuration device has the configuration private key.

4. The authentication method of claim 3, wherein the configuration parameter from the configuration device comprises identification information for the authentication device.

5. The authentication method of claim 3, further comprising:
   coupling the authentication device to a product, wherein the configuration parameter from the configuration device comprises product information corresponding to the product.

6. The authentication method of claim 2, further comprising:
   storing the configuration private key on the configuration device; and
   storing the configuration public key certificate on the configuration device.

7. The authentication method of claim 2, wherein the configuration public key certificate comprises a restriction.

8. The authentication method of claim 1, further comprising:
   receiving, at the authentication device, a plurality of configuration public key certificates within a configuration certificate chain associated with the configuration device, wherein the configuration root certificate stored on the authentication device forms the root of trust for the configuration certificate chain; and
   verifying, at the authentication device, each of the configuration public key certificates within the configuration certificate chain.

9. The authentication method of claim 1, wherein the verification device comprises a near field communication (NFC) electronic device.

10. The authentication method of claim 9, wherein the NFC electronic device comprises:
    a mobile telephone having NFC communication functionality.

11. An authentication device comprising:
    a memory device configured to store data; and
    processing logic coupled to the memory device, wherein the processing logic is configured to store, in the memory device, the following: a device authentication private key; a device authentication public key certificate linked to a trusted authentication root certificate; and a configuration root certificate; wherein the processing logic is further configured to use the device authentication private key and the device authentication public key certificate to facilitate authentication of the authentication device to a verification device according to a device authentication protocol; wherein the processing logic is further configured to use the configuration root certificate to facilitate authentication of a configuration device to the authentication device according to a configuration authentication protocol, wherein the device authentication protocol and the configuration authentication protocol use two separate certificate chains that both originate from a trusted party as a root of trust.

12. The authentication device of claim 11, wherein the processing logic is further configured to receive a configuration parameter from the configuration device, and store the configuration parameter in the memory device in response to a determination at the authentication device that the configuration device has the configuration private key corresponding to the configuration public key certificate.

13. The authentication device of claim 12, wherein the configuration parameter comprises identification information for the authentication device.

14. The authentication device of claim 12, wherein the configuration parameter comprises product information corresponding to a product to which the authentication device is coupled.

15. A system comprising the authentication device of claim 12, wherein the verification device comprises a near field communication (NFC) electronic device.

16. The system of claim 15, wherein the NFC electronic device comprises a mobile telephone having NFC communication functionality.

* * * * *